May 10, 1927.  F. E. BEST  1,628,103
MULTIPLE STATION AUTOMATIC MACHINE
Filed Jan. 10, 1924   17 Sheets-Sheet 7
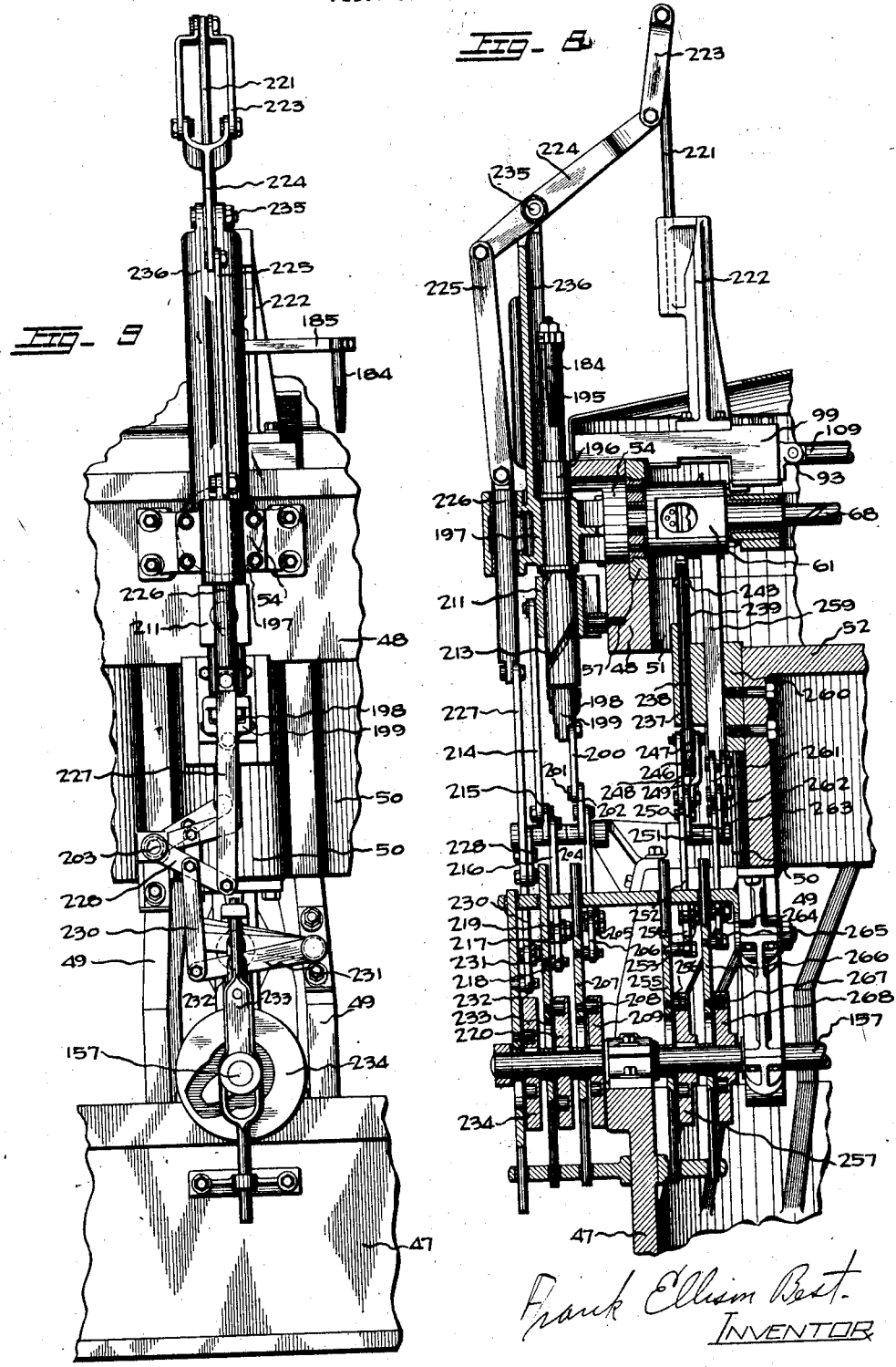
Frank Ellism Best.
INVENTOR

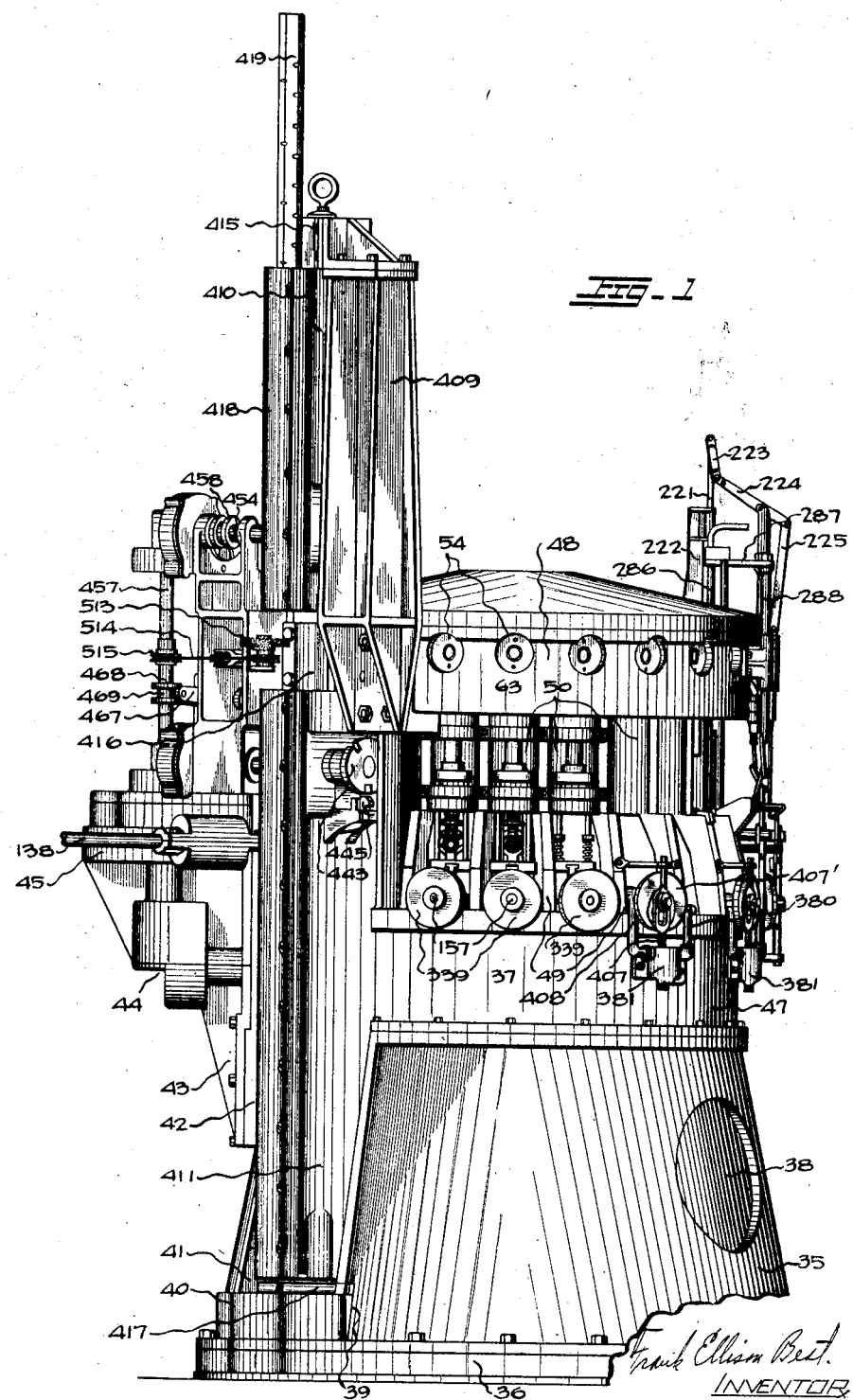

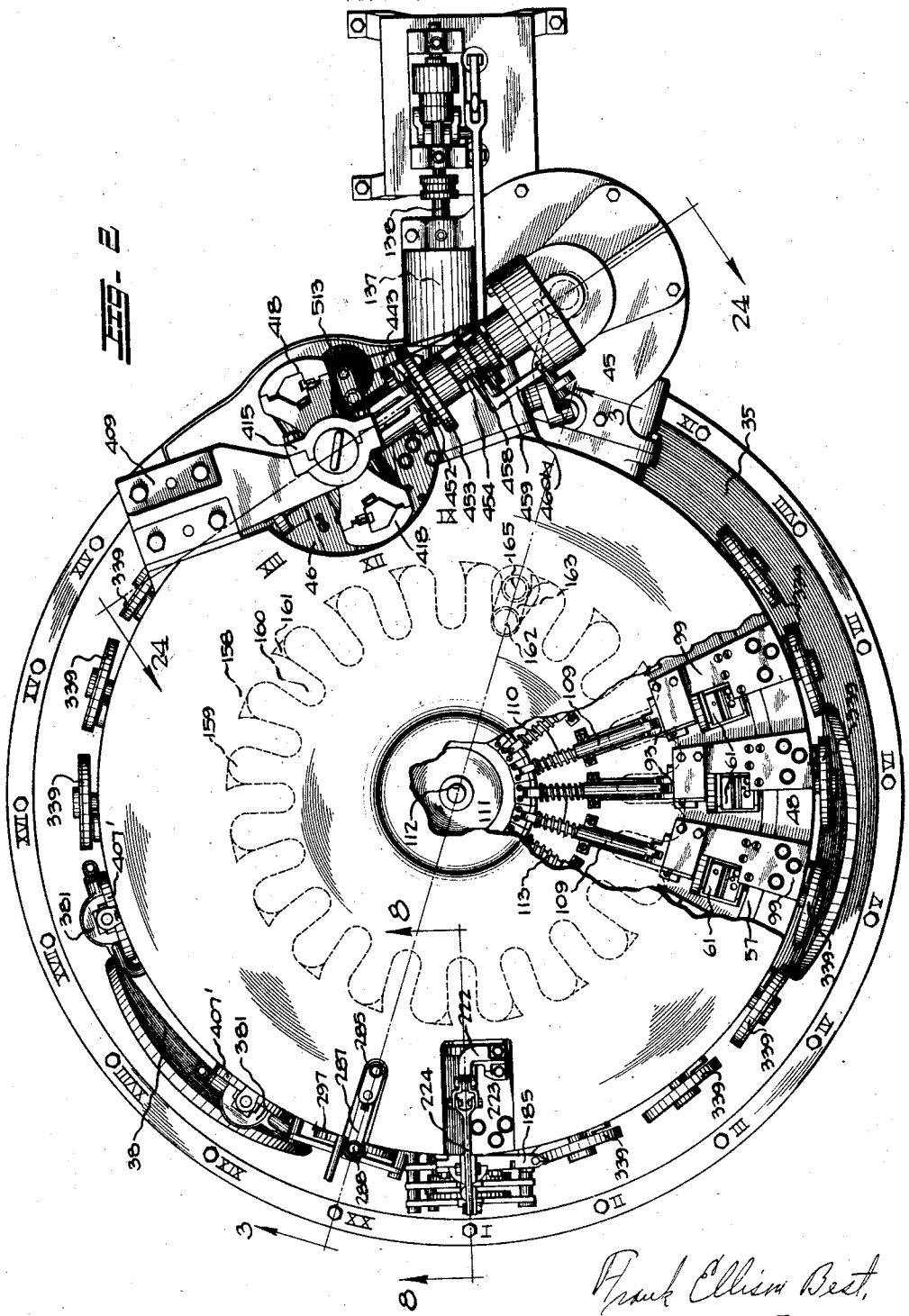

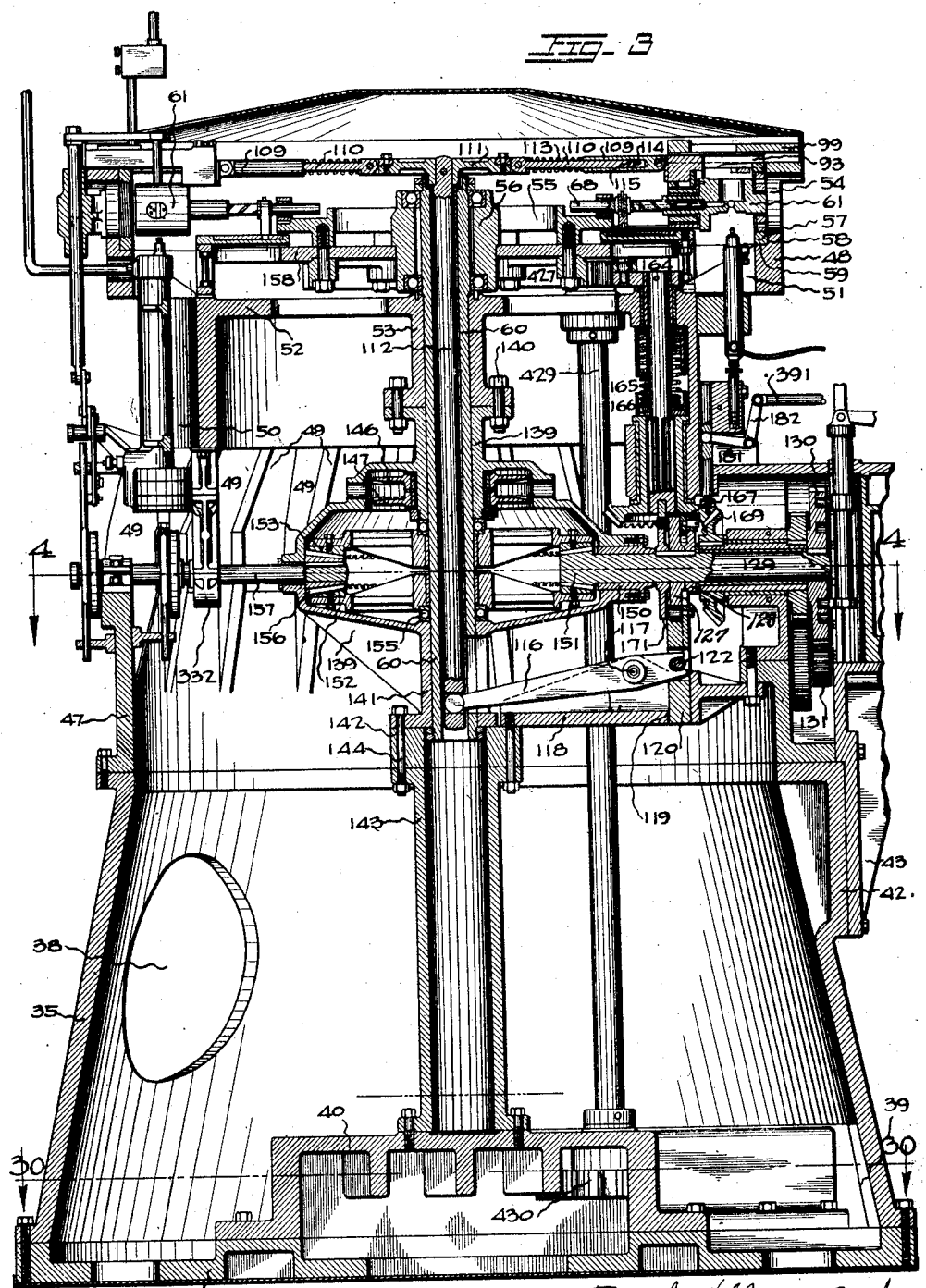

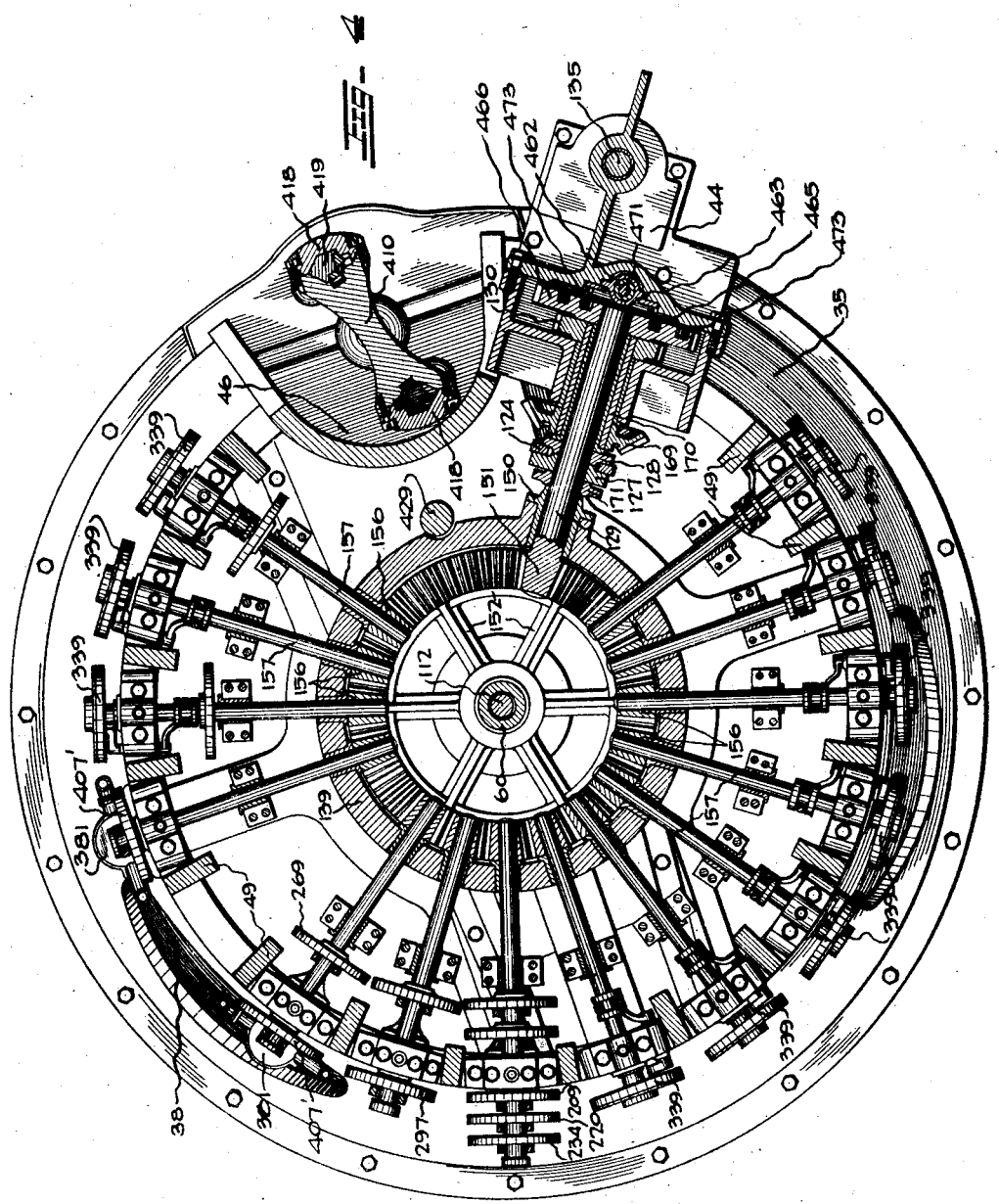

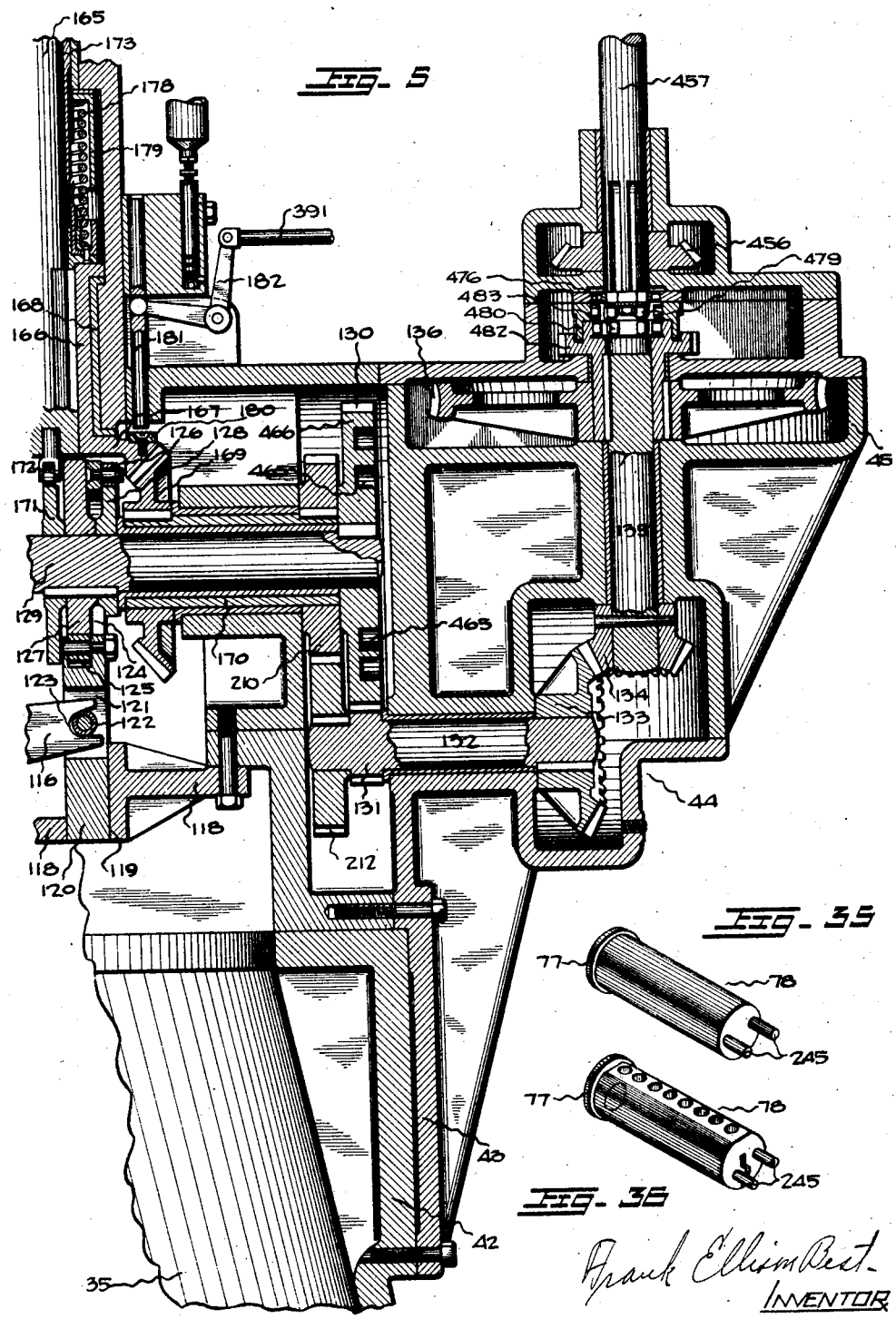

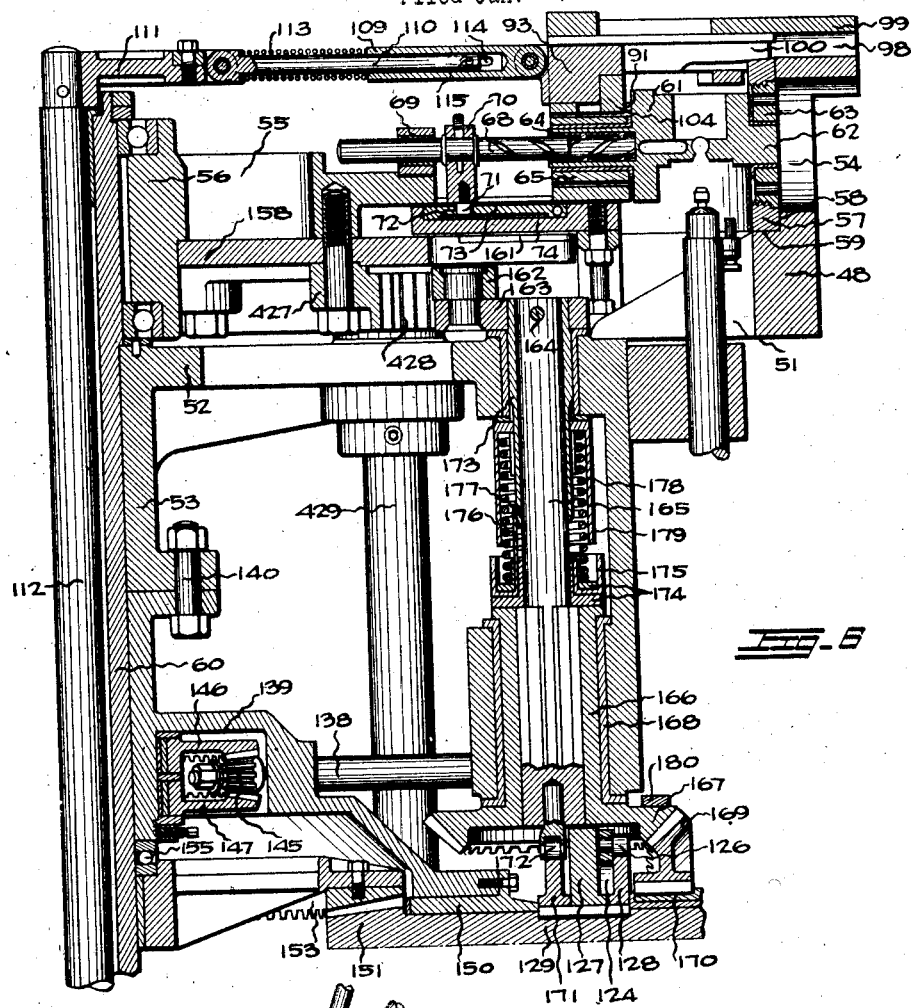
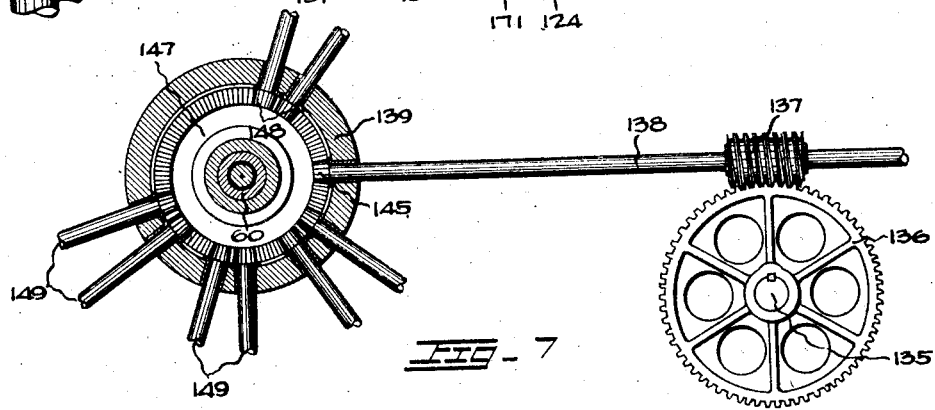

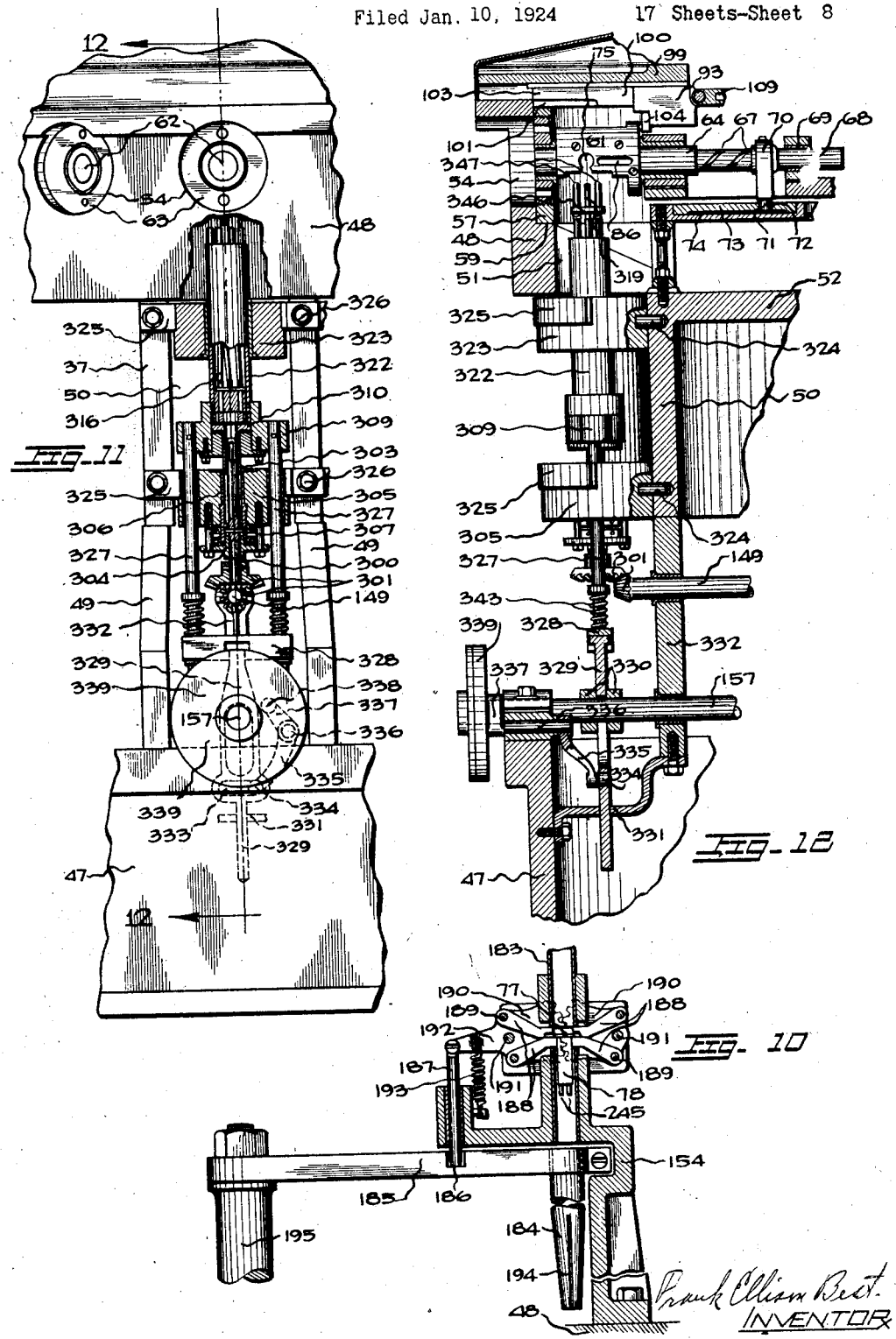

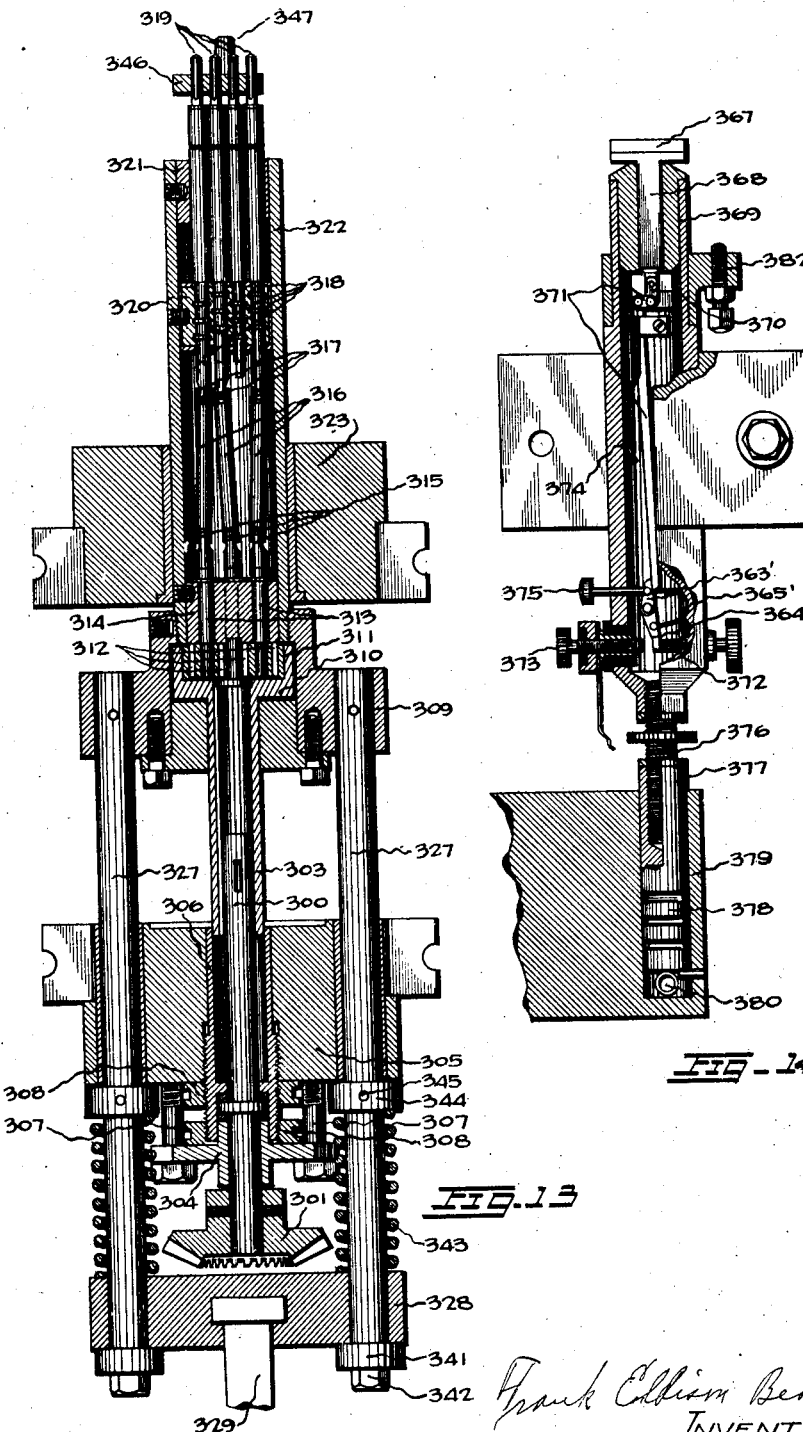

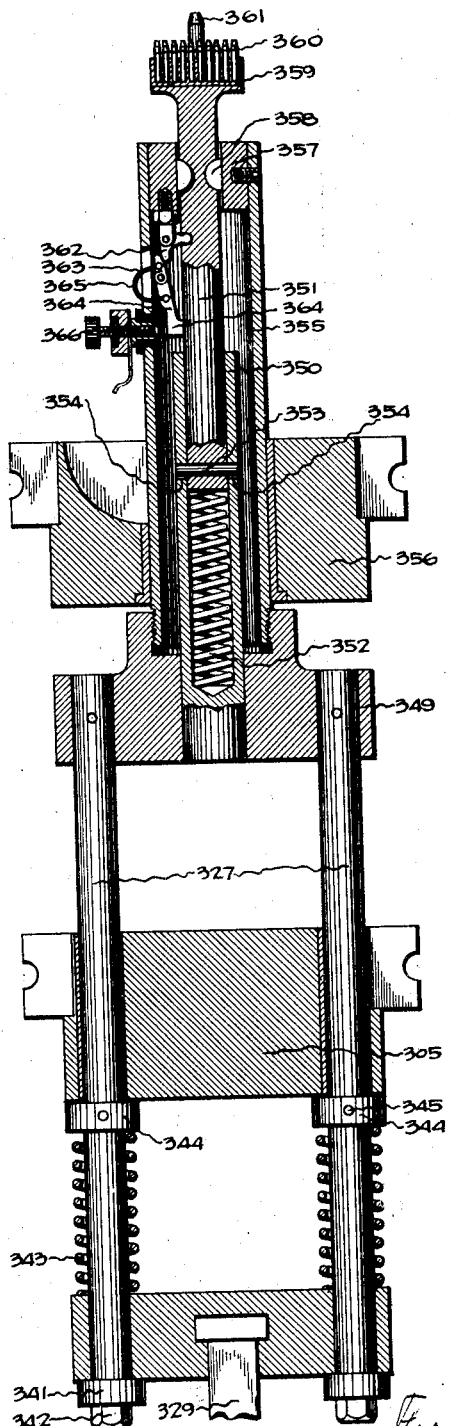

May 10, 1927.
F. E. BEST
1,628,103
MULTIPLE STATION AUTOMATIC MACHINE
Filed Jan. 10, 1924     17 Sheets-Sheet 11
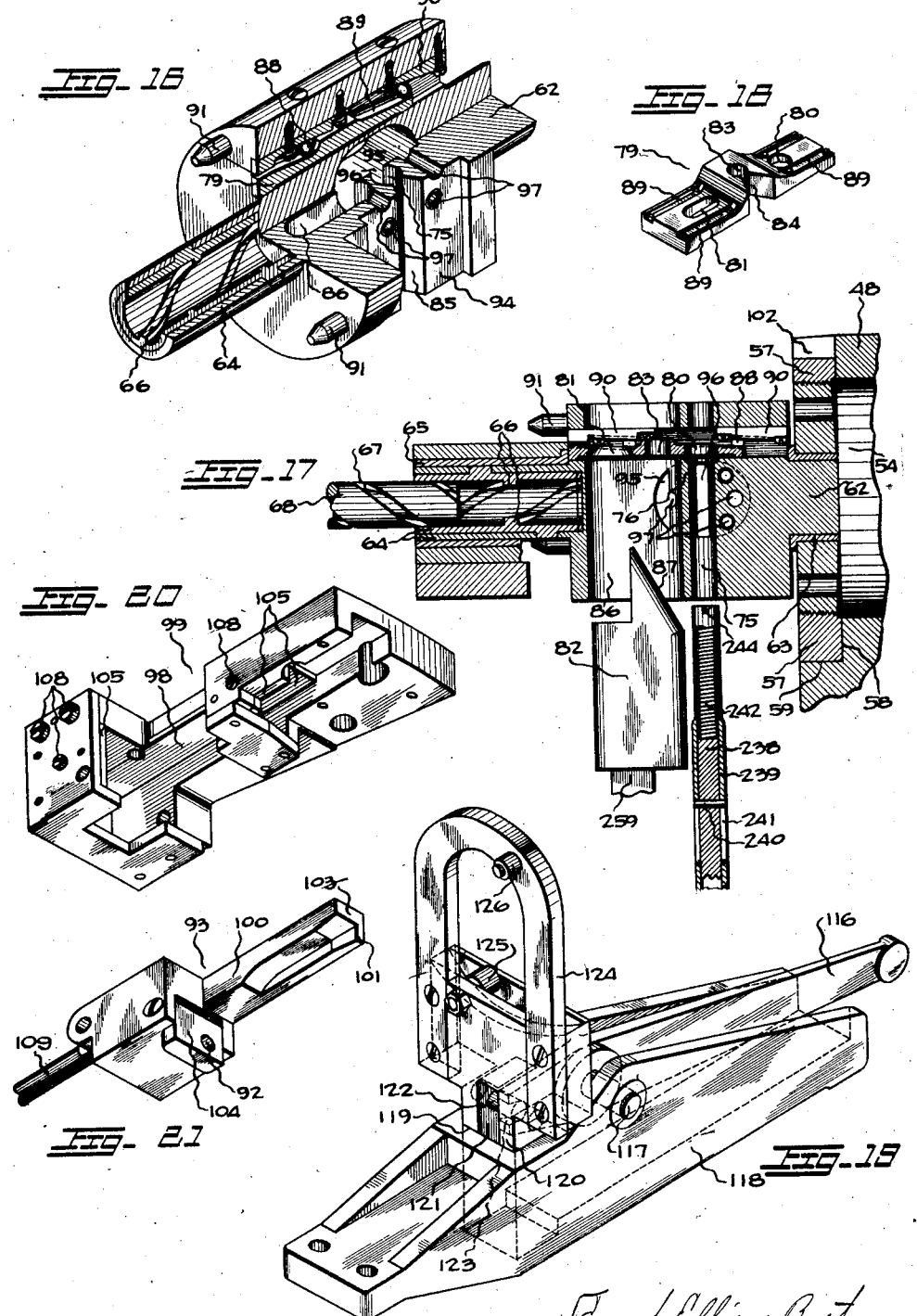

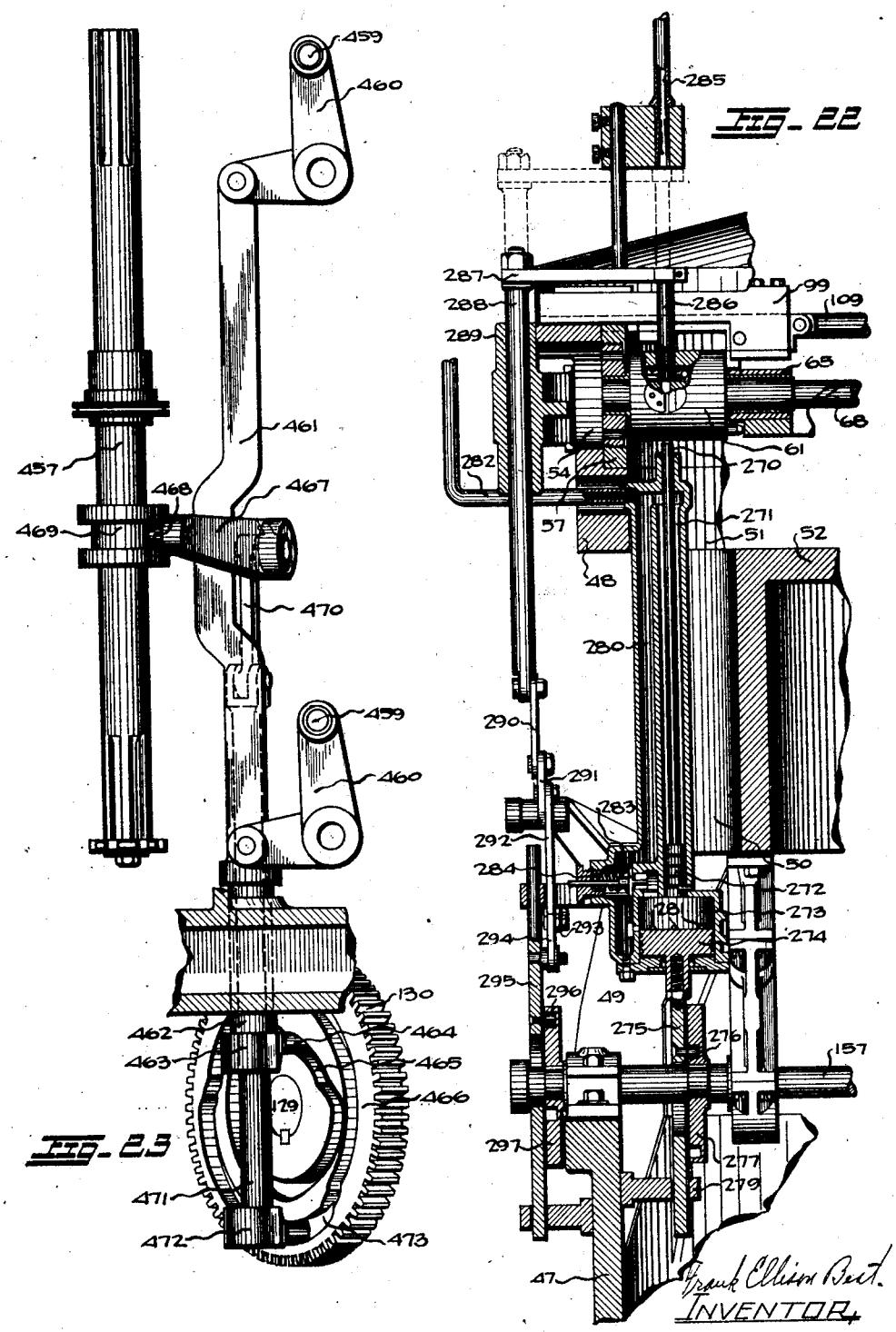

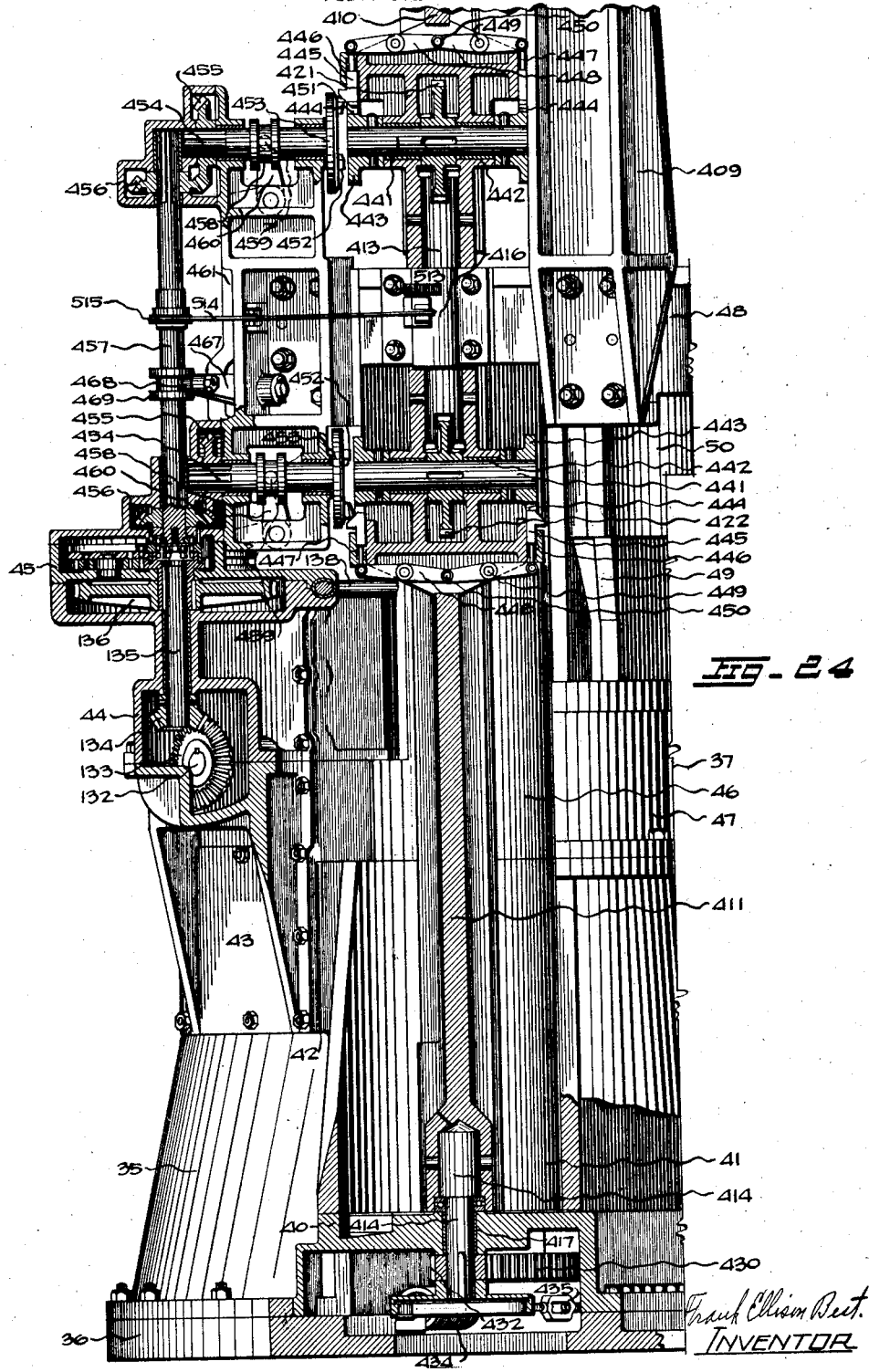

May 10, 1927.　　　　　F. E. BEST　　　　　1,628,103
MULTIPLE STATION AUTOMATIC MACHINE
Filed Jan. 10, 1924　　　17 Sheets-Sheet 14
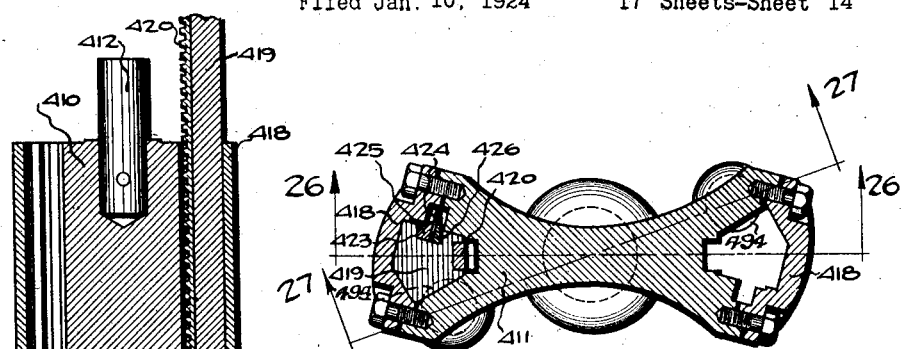
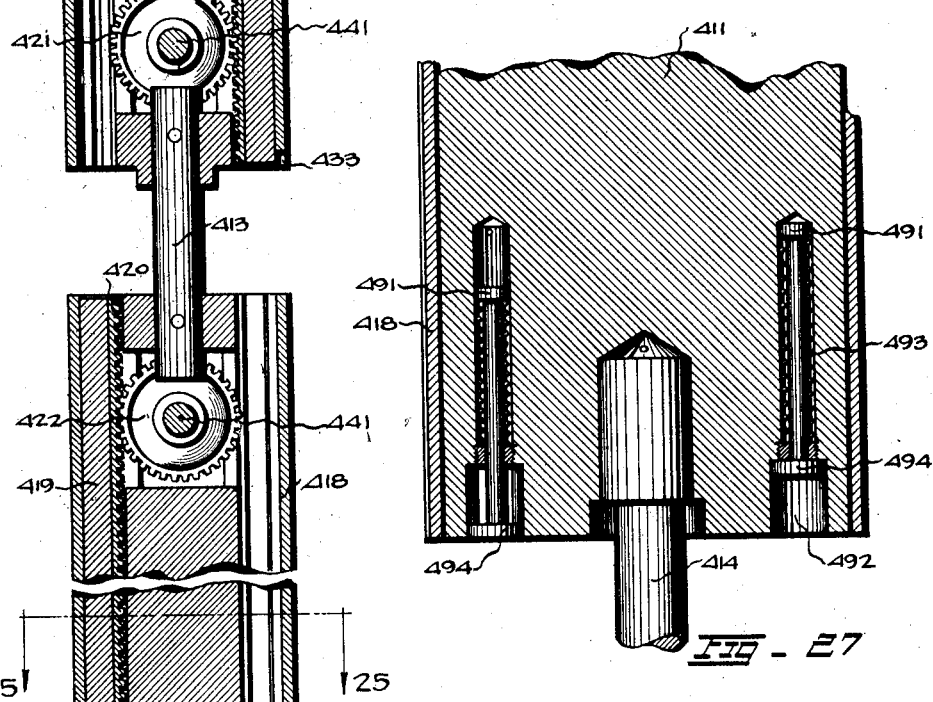
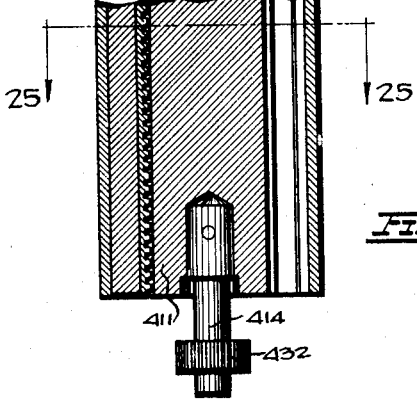
Frank Ellism Best
INVENTOR

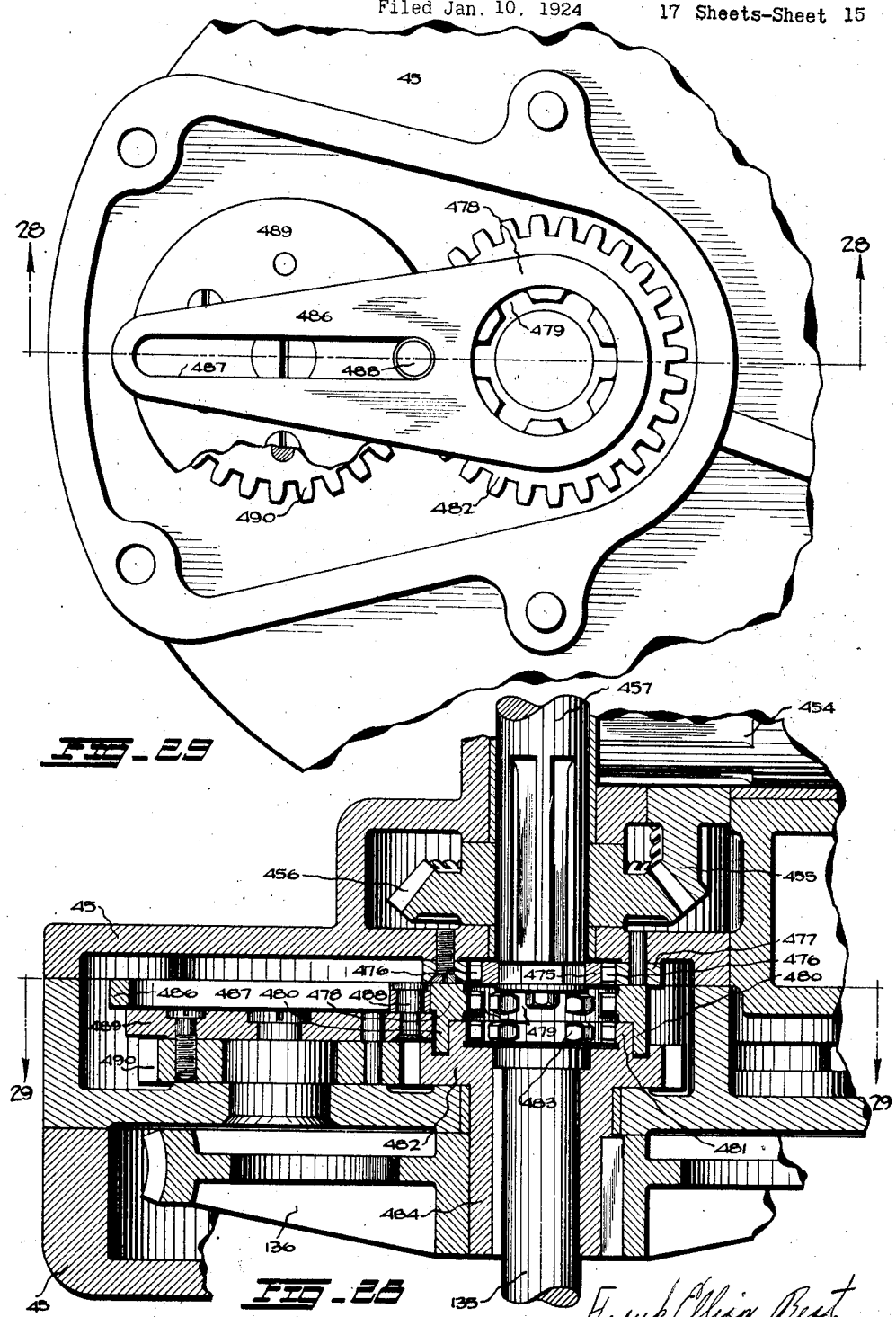

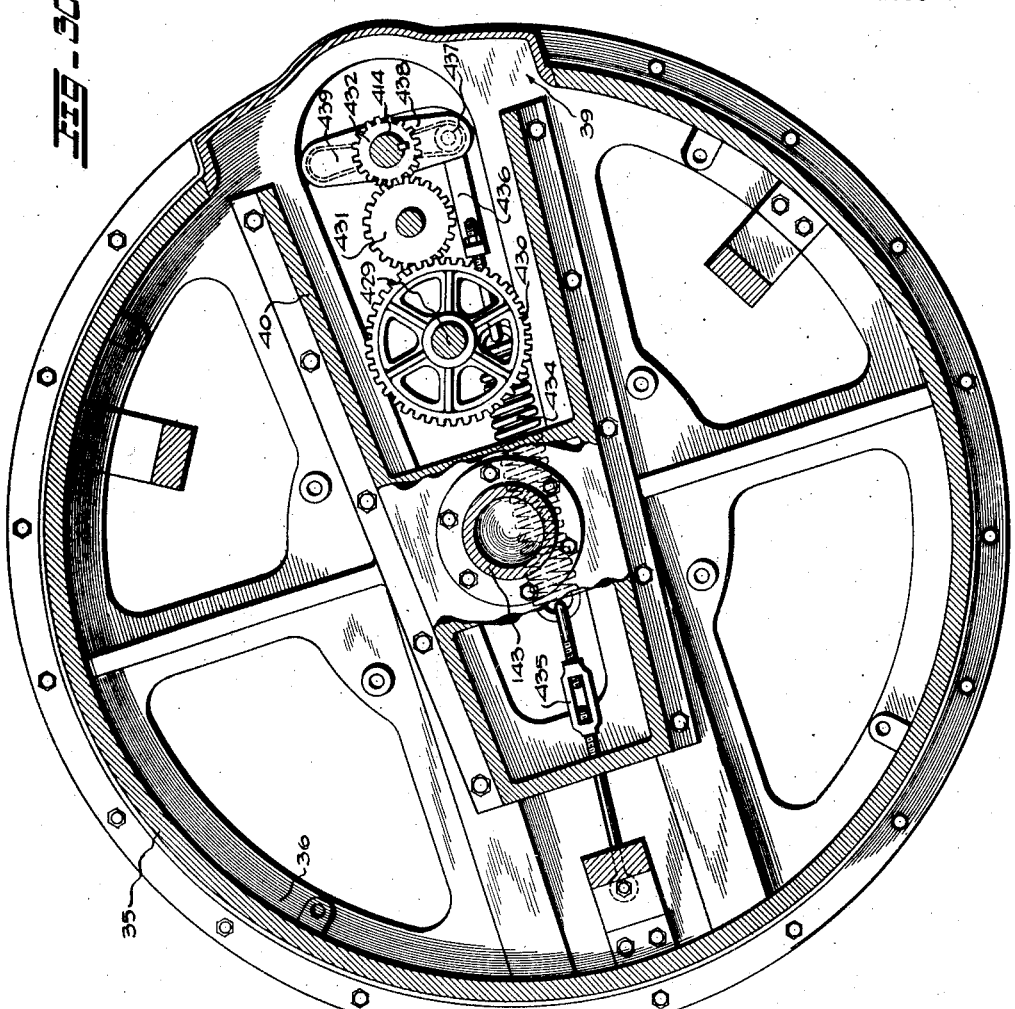
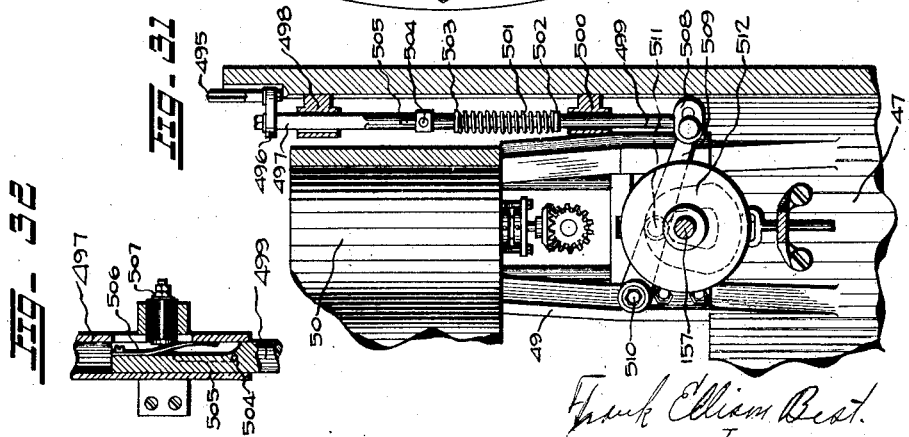

May 10, 1927.   1,628,103
F. E. BEST
MULTIPLE STATION AUTOMATIC MACHINE
Filed Jan. 10, 1924   17 Sheets-Sheet 17

Frank Ellison Best
INVENTOR

Patented May 10, 1927.

1,628,103

UNITED STATES PATENT OFFICE.

FRANK ELLISON BEST, OF SEATTLE, WASHINGTON.

MULTIPLE-STATION AUTOMATIC MACHINE.

Application filed January 10, 1924. Serial No. 685,382.

My invention relates to improvements in multiple station automatic machines and the object of my improvement is to provide an automatic machine of large capacity that is capable of turning out work of great accuracy at a very rapid rate and that requires very little attention and is very economical in operation.

Other objects are to provide an automatic machine of the upright or vertical type which is relatively simple in construction as compared to the work it is designed to perform and in which all of the operating parts are freely and easily accessible for purposes of adjustment, repair or replacement.

Further objects are to provide an automatic machine of this nature having a normally horizontal work carrying table mounted for indexing movement on a vertical axis and provided around its periphery with a plurality of work clamping hands arranged to clamp and hold work and to be indexed or turned into various adjusted positions so that the work is made accessible to various driven tools and testing devices that are supported for vertical movement at the several stations below the work clamping hands.

A further object is to provide a multiple spindle automatic machine of this nature having at one station vertically movable broach mechanism by which a broaching operation may be done on the work that is being operated on at the other stations by various forms of rotating tools.

A further object is to provide a machine of this nature having an axially disposed gear box from which all tool driving and cam driving shafts radiate, said gear box being provided with two sets of bevel gears, each set comprising two gears between which are disposed a plurality of driven pinions thus affording a power transmission of great efficiency in which strains, wear and vibration are reduced to a minimum.

Further objects are to provide safety devices at all vital points so that all possible danger of doing serious damage to the machine in case of accident will be eliminated.

Other and more specific objects will be apparent from the following description taken in connection with the accompanying drawings:

In this application I have disclosed a multiple station automatic machine that is adapted for performing certain drilling, broaching, milling and testing operations on a key plug of a form used in pin tumbler locks but it will be understood that this disclosure is merely illustrative and that the machine is capable of being adapted to various forms of work involving tools of many different shapes and sizes.

In the drawings Figure 1 is a view in side elevation of a multiple station automatic machine of the class described.

Fig. 2 is a plan view of the same.

Fig. 3 is a view in vertical section of the same substantially on vertical line 3—3 of Fig. 2.

Fig. 4 is a view in horizontal section substantially on broken line 4—4 of Fig. 3.

Fig. 5 is a fragmentary sectional view on a larger scale than Fig. 3 showing certain parts that are omitted from Fig. 3.

Fig. 6 is a fragmentary sectional view showing parts of the machine.

Fig. 7 is a detached fragmentary view partly in plan and partly in section of certain portions of the driving mechanism embodied in the invention.

Fig. 8 is a fragmentary sectional view substantially on broken line 8—8 of Fig. 2 showing certain mechanism by which the blanks or pieces of work are loaded into the machine.

Fig. 9 is a fragmentary view in elevation of the loading devices shown in Fig. 8.

Fig. 10 is a fragmentary detail partly in section and partly in elevation showing mechanism for controlling the feeding of the blank pieces of work to the loading devices.

Fig. 11 is a fragmentary view partly in section and partly in elevation showing the mechanism of a typical drilling station.

Fig. 12 is a sectional view substantially on broken line 12—12 of Fig. 11, showing certain parts in elevation.

Fig. 13 is a sectional view on a larger scale illustrating the mechanism at a drilling station.

Fig. 14 is a sectional view showing mechanism for testing a flat milling operation.

Fig. 15 is a sectional view showing mechanism for testing drilling work.

Fig. 16 is a perspective view partly in cross section showing a work holding hand.

Fig. 17 is a view in vertical section showing the work holding hand and certain parts of the machine that operate in connection therewith.

Fig. 18 is a detached view in perspective of a work clamping plate used in the work holding hand.

Fig. 19 is a detached view in perspective of mechanism that is used for actuating the locking devices.

Fig. 20 is detached perspective view showing a guide bracket for a locking member.

Fig. 21 is a detached perspective view showing a locking member arranged to operate in the guide bracket shown in Fig. 20.

Fig. 22 is a fragmentary sectional view showing certain mechanism for unloading or ejecting the finished work from the machine.

Fig. 23 is a detached view partly in elevation and partly in cross section of parts of broach operating mechanism.

Fig. 24 is a vertical sectional view through the broach mechanism substantially on broken line 24—24 of Fig. 2.

Fig. 25 is a detached view in cross section of a broach guide and broach bar substantially on a broken line 25—25 of Fig. 26.

Fig. 26 is a view in vertical section of the broach bar substantially on broken line 26—26 of Fig. 25.

Fig. 27 is a fragmentary sectional view of the lower end of the broach bar taken on line 27—27 of Fig. 25.

Fig. 28 is a detached sectional view on a larger scale of parts of the broach driving mechanism.

Fig. 29 is a plan view on line 29—29 of Fig. 28.

Fig. 30 is a view partly in plan and partly in horizontal section substantially on broken line 30—30 of Fig. 3 showing the base portion of the housing and parts of the broach indexing mechanism.

Fig. 31 is a fragmentary view partly in section and partly in elevation showing mechanism used for testing the work of the broaching tools and for burring or cleaning out the slot formed by said broaching tools.

Fig. 32 is an enlarged fragmentary sectional view of electrical contact making devices used in the apparatus shown in Fig. 31.

Figs. 35 and 36 are perspective views showing a key plug blank as it may appear before being fed into this machine and after it has passed through the machine respectively.

Like reference numerals designate like parts throughout the several views.

Figure 33:
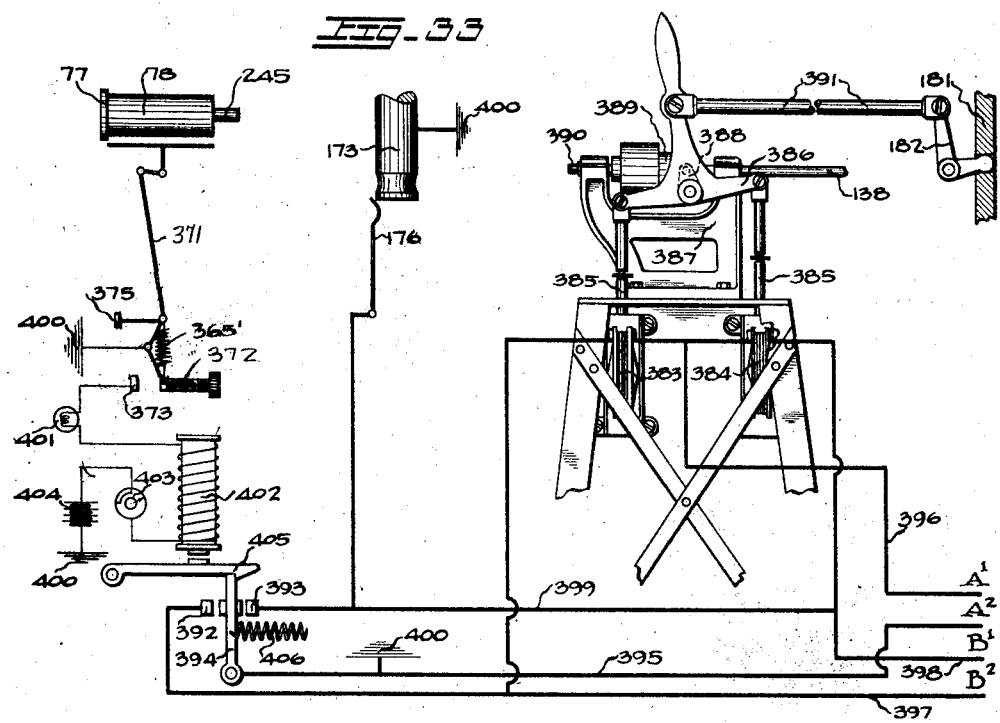
Fig. 33 is a somewhat diagrammatic view showing electrical control and safety devices.

The accompanying drawings show a multiple station automatic machine embodying a lower frame 35 that rests upon and is secured to a base 36 and that supports an upper frame 37 which is rigidly secured thereto, Figs. 1, 2, 3, and 4. The lower frame 35 is provided with a plurality of manholes 38 through which entrance may be had to the interior and is further provided on one side at the bottom with an opening 39 through which extends a gear housing 40, Figs. 3, 24 and 30, that is secured to the base 36. The lower frame is recessed or indented as at 41 above the opening 39 to afford working clearance space for broach mechanism hereinafter described and is provided adjacent the recessed portion with a flattened portion or pad 42 to which a bracket 43 that supports a lower gear housing 44 and an upper gear housing 45 may be secured.

The upper frame portion 37 is provided with an indentation 46, Fig. 4, that registers with the indentation 41 in the lower frame portion 35. The upper frame consists of a lower ring-like portion 47, Fig. 1, and an upper ring-like portion 48 that are integral with, and supported in spaced apart relation by web members 49 that lie in radial planes and by a fluted portion 50 that is directly above the web members 49. The web portions 49 afford radial passageways for the operation of parts hereinafter described and other passageways 51, Figs. 3 and 6, are provided at the upper ends of the fluted portion 50, through which tools may be raised into engagement with the work.

A web formed of radially arranged spoke-like members 52 that converge in an axially arranged hub bearing 53, Figs. 2 and 3, is provided in the plane of the lower edge of the upper ring-like portion 48 and said upper ring-like portion is provided with a plurality of radial holes 54 of large enough size so that a work clamping hand may be inserted and moved therethrough.

A work table 55 is mounted on a centrally arranged ball thrust bearing 56, Figs. 3 and 6, and is arranged to be rotated in the upper portion of the upper housing, said work table having a peripheral rim portion 57, Figs. 3, 6 and 17 that fits within a recess 58 in the upper portion of the housing and the lower edge of which rests lightly on a shoulder 59 formed in the housing. The thrust bearing 56 rests on the hub 53 and is supported on an axial sleeve 60.

The work clamping hands, of which twenty are provided in the machine, are carried in the work table 55 that is rotatably mounted by means of bearing 56 on the central stem or sleeve 60 and that is arranged to be indexed as hereinafter described to move the hands successively to the various stations.

The hand, Figs. 2, 3, 6, 8, 16, 17, 18 and 22 designated generally by the numeral 61, which may be made from a solid steel cylinder, has a short axial bearing stud 62 at one end that is journaled in a bearing 63 and has a longer tubular axial bearing stud 64 at the other end that is journaled in a bearing 65 and is internally provided with a spiral thread 66 arranged to fit within a spiral groove 67 in a shaft 68. The shaft 68 is rotatably supported in a bearing 69 and is rigidly connected with a block 70 having a cam roller 71 that operates in a cam slot 72 in a fixed cam plate 73, Figs. 2, 3 and 12, that is supported in a cam plate bracket 74 which is rigidly secured to the frame. As the work table 55 indexes or moves from one position to another the cam slot 72 moves the shaft 68 and turns the hand 61 into the proper position to facilitate the application of tools to the work.

The hand is provided with a cylindrical recess 75, Figs. 16 and 17, extending diametrically therethrough, the upper end of which is arranged to receive any piece of work, as a key plug blank, said recess having an annular enlargement 76 within which a flange 77 on the end of the key plug 78, Figs. 35 and 36, may rest. A plug clamping slide 79, Fig. 18, movable longitudinally in a passageway in the hand 61 is arranged to clamp a key plug blank and hold the same in place within the hand, said slide having a perforation 80 through which a plug may be inserted, a slot 81 for the reception of a drift 82, Fig. 17, and an opening 83, that is positioned above the plug blank when the slide is in the clamping position to afford access of tools to the plug, said last named opening having a slot 84 entering from one side of the slide and intersecting the same, through which a broaching tool may operate. A slot 85 in the hand corresponding in position and shape to the slot 84 in the slide is provided throughout the entire length of the recess 75 to permit operation of the broaching tool.

The drift 82 operates through a passageway 86 in the hand and has an inclined face 87 that engages with the edge of the slot 81 in the plug clamping slide 79.

Ball or roller bearings 88 rolling between relatively inclined trackways 89 and 90 on the plug clamping slide 79 and wall of the hand 61 crowd the plug clamping slide securely down onto the top of the plug blank when the slide is moved by the drift 82.

The inner end of each hand is provided with outwardly protruding stud pins 91 that are arranged to fit within perforations 92 in a locking member 93 the ends of the pins 91 being tapered off as shown in Fig. 17 to insure registration with the perforations 92 and to cause the hand 61 to be positioned with exactness by the locking member 93.

The plug clamping hand is flattened on one side as at 94 to provide a stop surface and to afford clearance for the operation of the broach mechanism and said hand has a cavity 95 on the opposite side into which suitable drilling and testing tools may enter, the cavity 95 being connected with the recess 75 in which the plug is held by a slot 96 and a plurality of guide holes 97 being provided in the hand, said guide holes extending from the bottom of the cavity 95 to the flattened side 94 to receive guide pins on tools hereinafter described for the purpose of accurately positioning the tools.

As each hand 61 is moved around the machine to the various different stations it is turned by the cam 72 into the correct position to be worked on by the different tools.

The locking members 93, Figs. 20 and 21 are each arranged to slide within a guideway 98 in a guide member 99. Each locking member is provided with an outwardly protruding shank 100 having a flange 101 arranged to lock within a notch 102 in the rim portion 57 of the work table and another flange 103 arranged to press downwardly on the flange 57 of the work table. The outer ends of the flanges 101 and 103 are inclined as shown in Fig. 21 so that when the locking member is moved outwardly the work table will first be accurately positioned and will then be clamped down on the flange or shelf 59 of the frame. Provision is made for causing part of the positioning members around the work table to first position and lock the table and the remaining positioning members to then clamp the work table down on the flange or shelf 59.

A block 104 carried by each locking member 93 has holes 92 therein which fit over the studs 91 on the end of the hand 61 to position the hand. Suitable means are provided for securing the blocks 104 to the locking members 93 in such a manner that the position of the block may be accurately adjusted. Gib plates 105 are secured to the guide member 99 by screws 108 and serve as adjustable bearings for the locking members 93.

The locking members 93 are pivotally connected with the outer ends of sleeves 109, Figs. 2, 3 and 6 that fit telescopically over rods 110 which are pivotally connected at their inner ends with the peripheral portion of a disc 111, that is secured on the upper end of a vertically movable shaft 112. A compression spring 113 is interposed between the end of each sleeve 109 and a shoulder on each rod 110 and each sleeve is provided with a longitudinal slot 114 within which is disposed a pin 115 that extends crosswise of and is rigidly secured to the rod 110.

The vertically movable shaft 112 is arranged to be raised and lowered by a lever arm 116, Figs. 3, 5 and 19, that is mounted on a fulcrum 117, in a frame 118. Guided in a guideway 119 in the frame 118 is a block 120 having a slot 121 wherein is mounted a roller 122 that fits within a slot 123 in the shorter end of the lever arm 116. A bracket 124 of inverted U shape is secured to the block 120 as shown in Fig. 19. Cam rollers 125 and 126 are secured to the block 120 and to the bracket 124 respectively. Two cams 127 and 128 are arranged to engage the rollers 125 and 126 respectively to oscillate the lever arm 116. The cams 127 and 128 are mounted on a shaft 129 having a gearwheel 130, Fig. 5, on its outer end that meshes with a pinion 131 on a shaft 132 which last named shaft 132 is connected by bevel gears 133 and 134 with shaft 135 having worm wheel 136 that meshes with worm 137 on drive shaft 138. As the cams 127 and 128 rotate they oscillate the lever arm 116 thus operating the locking mechanism to lock and unlock the work table and the work clamping hand at the proper instants of time.

The shafts 132 and 135 are journaled in the gear housings 44 and 45 that are secured to the upper and lower frame members and that form receptacles for the bevel gears 133 and 134, and the worm wheel 136 and worm 137.

The driving mechanism for the various tools and for the cams that control the movement of the tools is contained within a two part housing 139, Fig. 3, that is secured at its upper end by bolts 140 to the hub 55 of the frame spider 52 and that is provided at its bottom end with a downwardly extending shank 141 arranged to rest on a block 142 that is supported on a tubular post 143 that rests on the base frame 40. Bolts 144 secure the shank 141, block 142 and post 143 together.

The drive shaft 138 extends into the upper portion of the housing 139 and is provided with a bevel pinion 145, Figs. 6 and 7, that is disposed between and meshes with two bevel gears 146 and 147 which are journaled on a shank that projects downwardly into the upper part of the housing 139. Pinions 148 are disposed at intervals between the bevel gears 146 and 147 and have radially directed tool drive shafts 149 for driving tools hereinafter more specifically described.

The shaft 129 projects through a bearing 150 into the lower portion of the housing 139 and is provided with a bevel pinion 151, Figs. 3 and 4, that is operatively disposed between two larger bevel gears 152 and 153 that are journaled on the tubular post 60 that projects upwardly through the housing 139 and that forms a guide for the vertically movable locking shaft 112. Ball thrust bearings 155 are provided for both bevel gears 152 and 153. A plurality of bevel pinions 156 are disposed between the bevel gears 152 and 153 and are connected with cam drive shafts 157 that radiate to the various stations.

The indexing of the work table is controlled by an indexing disc 158 having in its periphery alternate projections 159 and notches 160, see Fig. 2 that present substantially the appearance of a large toothed gear wheel, the projections 159 being rounded at the outer end and said projections each having a relatively thin plate 161 secured to the top edge thereof each plate having a curved edge that overhangs one edge of the projection to which it is secured.

A roller 162 on the end of a crank arm 163, Figs. 2, 3 and 6 that is secured by a shear pin 164 to a shaft 165 is arranged to engage within the notches 160 in the indexing disc 158 to move the same. The shaft 165 is splined in a sleeve 166 on a bevel gear 167, the sleeve being journaled in a bushing 168 in a bearing bracket in the frame 37. The bevel gear 167, Figs. 3, 5 and 6 meshes with another bevel gear 169 on a sleeve 170 that is rotatably mounted on the shaft 129 and has a gear wheel 210 on its outer end that meshes with and is driven by another gear wheel 212 on the shaft 132. The shaft 165 is arranged to be lifted by a cam 171 on the shaft 129 that engages with a cam follower 172 on the bottom end of the shaft 165.

A safety device in the nature of electrical contact making means is provided on the shaft 165, said means embodying a sleeve 173 fitting closely on the upper end of the shaft 165 and yet capable of sliding thereon, the upper end of the sleeve 173 being interposed between the crank arm 163 and the shaft 165 and the shear pin 164 passing through the shaft 165, sleeve 173 and crank arm 163 so that if said pin 164 is sheared off the shaft 165 may move within the sleeve 173. Secured to the shaft 165 just above the bearing 168 is a block formed of two pieces 174 of insulating material between which is a metallic member 175 having a contact tongue 176 positioned within a notch 177 in the lower end of the sleeve 173. A compression spring 178 interposed between the block 174 and the upper bearing bracket and shielded by a housing 179 serves to exert a downward pressure on the shaft 165 which shaft is lifted by the cam 171 and is lowered by the combined forces of gravity and of the spring 178 the block 174 being rigidly secured to the shaft 165.

If, when the shaft 165 is lifted, the roller 162 on the crank 163 strikes against any obstruction the shear pin 164 will be sheared off and the shaft 165 will be moved upwardly in the sleeve 173 bringing the contact tongue 176 into contact with the sleeve 173 closing an electric circuit lighting a signal lamp and stopping the machine as described in connection with Fig. 33. If the indexing disc 158 becomes locked so that the roller 162 can not turn the same when it is moved upwardly between the projections 159 and rotated then the shear pin 164 will be sheared off and the contact tongue 176 rotated relative to the sleeve 173 thus making electrical contact and closing a circuit that will light the signal lamp and stop the machine.

The bevel gear 167 has a stop lug 180, Figs. 3 and 5, on its upper surface that is arranged to be engaged by a rod 181 when said rod is lowered by the operation of a bell crank 182. As soon as the driving power to the machine is cut off the bell crank is released thus permitting the rod 181 to drop into the path of the lug 180, see Fig. 33, and stop the moving parts of the machine. The provision of this device makes it impossible for the bevel gear 167 to make more than one complete revolution after any safety device operates to cut off the power that drives the machine and further insures that the moving parts of the machine will always stop at the same location.

The several stations around the machine are designated consecutively by number from I to XX inclusive, Fig. 2, station number I being the loading station.

At the loading station Figs. 8, 9 and 10, I provide a magazine 183 that may contain work, as key plugs, properly formed and ready for the plug finishing machine and that is supported by a bracket 154 and is equipped with suitable mechanism for releasing said key plugs one at a time and permitting them to drop into a basket 184 which delivers said key plugs, one at a time into the work clamping hand 61 by which they are securely clamped and moved to the various stations where they are subjected to the operation of different tools.

The basket 184, Fig. 10, is carried on the end of a swingingly mounted arm 185 having an inclined surface 186 arranged to engage with and lift a vertically movable pin 187 each time the basket 184 is moved beneath the magazine 183 to thereby release the lowermost plug 78 and permit it to drop into said basket. The plugs 78 may be supported on fingers 188 that engage below the flange 77 of the plug 78 as shown in Fig. 10. The fingers 188 are arranged in pairs, two upper and two lower, and the fingers of each pair are disposed at diametrically opposite points. The outer ends of the fingers 188 are secured by pins 189 to gear segments 190 that are mounted on pivots 191. One of the gear segments 190 is provided with an arm 192 arranged to be raised by the pin 187 and to be lowered by a spring 193. Normally the lowermost fingers 188 will engage beneath the flange 77 of the lowermost key plug 78 and support the same in the position shown in Fig. 10. As the arm 185 moves around under the magazine it will engage with and raise the pin 187 thus raising arm 192, moving lower fingers 188 outwardly and permitting the lowermost plug to drop just as the basket 184 is stopped below the lower end of the magazine. As the lower fingers 188 move out the upper fingers move in so that as the first or lower plug drops the next plug will be caught and held momentarily by the upper fingers. As soon as the arm 185 begins to move away from the position in which the basket has received the plug the spring 193 will move the arm 192 downwardly thereby withdrawing the upper fingers and permitting the plug to drop down onto the lower fingers in readiness to drop into the basket at the next cycle.

The basket 184 consists of a tube of thin resilient metal slotted from its lower end upwardly as at 194 slightly convergent toward the lower end and of the proper size so that when a key plug blank 78 is dropped thereinto it will be retained within the basket but will not project therefrom. The basket 184 is carried on the end of the arm 185 which arm is secured to a shaft 195 reciprocably disposed within a sleeve 196 that is journaled in a bearing member 197. The lower end of the shaft 195 is rotatably connected by means of a collar 198 and shackle 199 with a link 200 which is connected by pivot 201 with lever arm 202 that is pivoted on pin 203 and is adapted to be oscillated by link 204 that is pivotally connected at its lower end with lever 205 that is fulcrumed on the frame and is connected by link 206 with vertically movable cam bar 207 having roller 208 that operates in a slot in cam 209 which is mounted on cam shaft 157.

The shaft 195 is oscillated to swing the basket from the plug receiving to the plug discharging position and vice versa by a sleeve 211 that is reciprocable on the sleeve 196 and that has an internal spiral thread that fits within spiral grooves 213 in the sleeve 196. Reciprocation of the sleeve 211 is accomplished by link 214 lever 215 link 216 lever 217 link 218 cam follower 219 and cam 220.

The cams 209 and 220 are arranged and coordinated so that they will move the basket 184 in a continuous cycle, said basket, after receiving a plug blank being swung into alignment with and lowered into the plug receiving socket in the plug clamping hand where the plug is discharged, then being raised above the plug clamping hand and again swung back into alignment with the magazine to receive another plug.

As the basket 184 with a rough key plug therein is lowered into position within the plug receiving recess 75 in the plug clamping hand 61 a reciprocating ejector rod 221 is lowered into said basket and pushes the plug out of the basket into the recess 75, the lower slotted portion of the basket expanding to permit the ejection of the plug.

The ejector rod 221 is reciprocably guided in a frame bracket 222 and is connected in the order named by links 223, lever 224, link 225, reciprocable bar 226, link 227, lever 228 pivoted on 203, link 230, lever 231, link 232, and cam follower 233 with cam 234. Lever 224 is fulcrumed on a pivot 235 on frame bracket 236 and reciprocable bar 226 is guided in a suitable bearing in said frame bracket 236.

As soon as a plug blank 78 is lowered into the recess 75 in the plug clamping hand 61 and held against upward movement by clamping member 79 a positioning plunger that is guided for reciprocation and rotary movement in a tubular bearing member 237 is elevated against the bottom end of the plug 78 and rotates the same into the correct position, in which position said plug is securely clamped and held by clamping member 79. The plug positioning member Figs. 8 and 17 comprises an inner rod 238 that fits telescopically into a sleeve 239 and is afforded a limited reciprocatory movement in said sleeve 239 by means of a cross pin 240 in the rod 238 that operates in slots 241 in the sleeve 239. A compression spring 242 is provided in the upper end of the sleeve 239 for urging the rod 238 and sleeve 239 apart. Engagement of the end of the sleeve 239 with the bottom of the key plug limits the upward movement of the sleeve, and a shoulder 243 on the sleeve is arranged to engage the top of the bearing 237 to limit the downward movement of the sleeve 239. The upper end of the sleeve 239 Fig. 17 has two oppositely disposed notches 244 for the reception of two pins 245 Figs. 35 and 36 on the bottom end of the plug blank 78 so that when the sleeve 239 is moved upwardly against the plug blank and rotated through an angle of 180° the pins 245 will drop into the notches 244 and the plug blank will be rotated into the correct position to be worked on.

The lower end of the rod 238 is enlarged and is provided with a spiral groove 246 that is arranged to receive a spiral thread on a sleeve 247 that fits thereon and is arranged to reciprocate and rotate the rod 238. A collar 248 on the bottom end of the rod 238 limits the downward movement of the sleeve 239. The pitch of the thread and groove is such as to cause the rod 238 to be lifted or lowered until it is stopped and to then be rotated.

The sleeve 239 is connected by links 249 with lever arm 250 that oscillates on bearing stud 251. The lever arm 250 is connected by link 252, lever arm 253, and link 254 with cam follower 255 having roller 256 that is operated by cam 257 on driven cam shaft 157.

The clamping plate 79 in the plug clamping hand 61 is operated by the reciprocable wedge shaped drift cam 82. The drift cam 82 has a rectangular shank 259 reciprocably disposed in guide bearing 260 and connected by links 261, lever 262, link 263, lever 264 and link 265 with cam follower 266 having roller 267 operating in a slot in cam 268 that is mounted on cam shaft 157.

After the various operations on a piece of work are completed the clamping mechanism that holds the work in the hand is unlocked. The unlocking occurs at the next to the last station, and at the last station the work is unloaded or ejected from the hand. The unlocking mechanism comprises a drift, not shown, of substantially the same form as shown in Fig. 17 at the loading station but reversed in position and arranged to be raised by a cam 269 to move the clamping block 79 to the unlocked position.

The unloading or ejecting devices, Fig. 22, comprise an ejecting rod 270 projecting into a smaller hydraulic cylinder 271 and having a piston 272 on its lower end. The smaller hydraulic cylinder 271 terminates at its lower end in a larger hydraulic cylinder 273 in which is disposed a larger piston 274 arranged to be moved by a piston rod 275 to which is secured a cam follower roller 276 that operates in a cam slot in a cam 277. The piston rod 275 is widened and slotted to fit over a cam shaft 157 and the lower end of said piston rod is guided in a bracket 279. Each time the larger piston 274 is moved upwardly a short distance by the action of the cam 277 the smaller piston 272 will be moved upwardly a much greater distance at a much faster speed and the ejector rod 270 will pass upwardly through the work clamping hand 61, which has previously been moved into a position directly above said piston rod, ejecting the finished piece of work therefrom.

Suitable by-pass means 280 are provided between the top of the smaller hydraulic cylinder 271 and the bottom of the larger hydraulic cylinder 273 so that liquid may flow freely between the two cylinders as the pistons reciprocate. Ports 281 are provided in the walls of the larger cylinder 273 at such a location that they will be uncovered by the lower piston 274 just as it reaches its lowermost position and will be covered by said lowermost piston in all other positions, said ports admitting liquid to the larger cylinder 273 and keeping a substantially constant amount of liquid between the pistons 272 and 274. A pipe 282 entering the upper end of the by-pass 280 may be used for the initial admission of liquid and for maintaining such liquid under constant pressure.

A relief valve 283 urged against a valve seat by a compression spring 284 may be interposed between the larger cylinder 273 above the larger piston 274 and the by-pass 280.

To take care of the finished work as it is ejected from the work clamping hand I provide a magazine or receiver tube 285, Fig. 22, supported directly above the work and a guide tube 286 carried on a vertically movable arm 287 that is secured to a rod 288 guided in a frame bracket 289 and connected by link 290 lever 291, link 292, lever 293, and link 294 with a slidably mounted cam follower 295 having a roller 296 arranged to operate within a slot in a cam 297 by which the cam follower 295 is reciprocated. As soon as the work clamping hand 61 is stopped at the last station the guide tube 286 is lowered into a position directly above the work and the ejector rod 270 then moves upwardly pushing the work into the guide tube 286, at which instant the guide tube 286 also begins to move upwardly and continues in its upward movement until it reaches a point immediately below the magazine 285 where the guide tube 286 is stopped and the ejector rod 270 continues to move upwardly until it discharges the piece of work in the magazine 285. The ejector rod is then withdrawn before the next indexing movement of the work table 55 but the guide tube 286 remains in a raised position until after another work clamping hand is moved into registration with the same.

After a key plug is clamped in the plug clamping hand at the loading station it is moved successively by steps of 18° to the various stations shown in Figs. 2 and 4 at which stations different kinds of work, as drilling, testing, milling, broaching, etc. is done.

The drilling operations may be successfully accomplished by tools of the form shown in Figs. 11, 12 and 13 each of which comprise a driven shaft 300 connected by bevel gears 301 with the tool driving shafts 157 that extend radially from the gear housing 139. The shaft 300 of each drilling unit is slidable within a sleeve 303 to which it is splined or key connected for rotation and said shaft 300 is journaled in a bearing 304 that is adjustably supported with respect to a frame bracket 305 by a sleeve 306, set screws 307 and lock nuts 308, Fig. 13.

The sleeve 303 is rotatably mounted in a cross head member 309 and is provided on its upper end with an enlarged shell or drum 310 having an internal gear 311 arranged to mesh with a plurality of pinions 312 that are connected with shafts 313 that are journaled in a bearing block 314. The upper ends of the shafts 313 are connected by universal joints 315 with the lower ends of shafts 316, the upper ends of which shafts 316 are connected by other universal joints 317 with the lower ends of shafts 318 in the outer ends of which drills 319 are mounted. The drill shafts 318 are rotatably mounted in bearings 320 and 321 in a sleeve 322.

The sleeve 322 is slidably mounted in a bearing member 323 and is rigidly connected with the cross head 309. The upper and lower bearing members 323 and 305 are each arranged to fit within recesses in the fluted portion 50 of the frame 37 and are provided with dowel pins 324, Fig. 12, for accurately positioning said bearing members and are arranged to be secured to the frame 37 by semicircular bands 325 secured in place by screws 326 whereby any drilling unit may be quickly removed and replaced by another.

The cross head 309 is connected by rods 327 with a cross bar 328 which is detachably connected with an operating bar 329, Figs. 11, 12 and 13, that is guided for vertical movement between two collars 330 on a cam shaft 149 and a bracket 331 that extends between a bearing bracket 332 and the frame member 47. The operating bar 329 has a transverse slot 333 wherein is operably disposed a roller 334 on the end of a crank arm 335 that is secured to a short shaft 336 that extends through and is journaled in the adjacent cam shaft bearing 332. The outer end of the short shaft 336 is rigidly connected with a shorter crank 337 having a roller 338 that operates in a slot in a cam 339 which serves to raise and lower the drilling unit with respect to the work.

The cross bar 328 is slidable on the rods 327, is held against removal from said rods by washers 341 and set screws 342 at the bottom of said rods and is resiliently supported on the rods 327 by compression springs 343 that abut against collars 344 that are secured to the rods 327 by shear pins 345. The springs 343 are strong enough so that they will not be compressed in the ordinary operation of the tool but if the drills encounter any obstruction preventing them from moving upwardly the springs will first compress and after they are fully compressed the shear pins 345 may shear off and permit the collars 344 to move upwardly on the rods 327 without damage to other parts. If means are provided for stopping the drills at an exact location the springs 343 may compress slightly without injury to any parts each time the drills move upwardly.

The pinions 312 within the internal gear 311 that drive the drills are arranged around a common center and the universal joints and shafts hereinbefore described are used to transfer the rotary movement to the drills 319 which are located in a straight line. In some instances it may be advisable to use flexible shafts instead of rigid shafts and universal joints for this work.

In some instances the holes that are to be drilled are so close together that it has been found advantageous to do the drilling at two operations, drilling alternate holes at each operation.

The drills 319 are preferably guided in a jig plate 346 that is supported from the sleeve 322 and that has dowel pins 347 arranged to enter the guide perforations 97 in the work clamping hand 61 to guide the drills accurately to the work.

If a single rotary tool as a drill or milling cutter is to be used the internal gear 311 and pinions 312 Fig. 13, may be dispensed with and the sleeve 322 extended and provided on the end with suitable chuck and bearing means for holding and guiding the tool.

At the testing stations, Fig. 15, where the drilled work is tested the same lifting bars 327 shown in Figs. 11, 12 and 13 are used and are connected in the same manner with operating cam 339 but the drill and cross head units are replaced by a cross head 349 and a testing unit embodying a sleeve 350 secured to the cross head, and a rod 351 arranged to telescope into the sleeve 350 and rest upon a compression spring 352. A cross pin 353 extending through short longitudinal slots 354 in the sleeve 350 and through the end of the rod 351 limits the movement of the rod 351 relative to the sleeve 350. A tube 355 serves as a housing for parts of the sleeve 350 and rod 351, said tube being secured to the cross head 349 and slidably mounted in a bearing 356. The upper end of the rod 351 passes slidably through a bushing 357 in the end of the tube 355 and is held against turning by keys 358. A pin holding block 359 having accurately spaced pins 360 that are arranged to enter and test the holes that have been drilled is mounted in the enlarged upper end of the rod 351. Dowel pins 361 in block 359 on the upper end of testing rod 351 are arranged to fit within the holes 97 in the plug clamping hand to insure accurate positioning of the test pins 360.

A bell crank shaped contact arm 362, Fig. 15, is provided in the tube 355 for the purpose of closing an electric circuit in case the test pins 360 strike an obstruction before arriving at the place where they should stop in their upward movement. The contact arm 362 is fulcrumed on a fixed pivot and has its horizontal end positioned in a recess in the rod 351 while the vertical end of said contact arm is arranged to engage with a snap switch embodying two arms 363 and 364 pivoted together and connected with each other by spring 365, the lower arm 364 normally resting against the rod 351 but being arranged to snap over and make contact with contact post 366 in case the testing tool encounters an obstruction and the rod 351 moves downwardly within the tube 350 thereby closing a circuit that will prevent further operation of the machine as hereinafter explained. All stations for testing drilling work are provided with similar contact means.

For testing milling operations etc., I provide mechanism of the form shown in Figs. 3 and 14 said mechanism embodying a testing tool or block 367 on the upper end of a shank 368 that is movable vertically through a bushing in the upper end of a tube 369, which tube is reciprocably supported in a suitable bearing that is rigidly secured to the frame.

The lower end of the shank 368 is connected by a link 370 with the short arm of a bell crank lever 371 whose longer arm extends downwardly in the tube 369 and is arranged to engage with the upper end of a snap switch of the form described in connection with Fig. 15, said switch being formed of two members 363' and 364' pivoted together and connected with each other by a spring 365' the lower switch member 364' normally resting against a stop 372 but being arranged to snap over and engage an electrical contact member 373. A flat spring 374 adjustably secured to the longer arm of bell crank arm 371 is arranged to yieldingly urge said arm to the right. A push button 375 is provided for replacing the switch members 363' and 364' after contact has been made.

Figure 34:
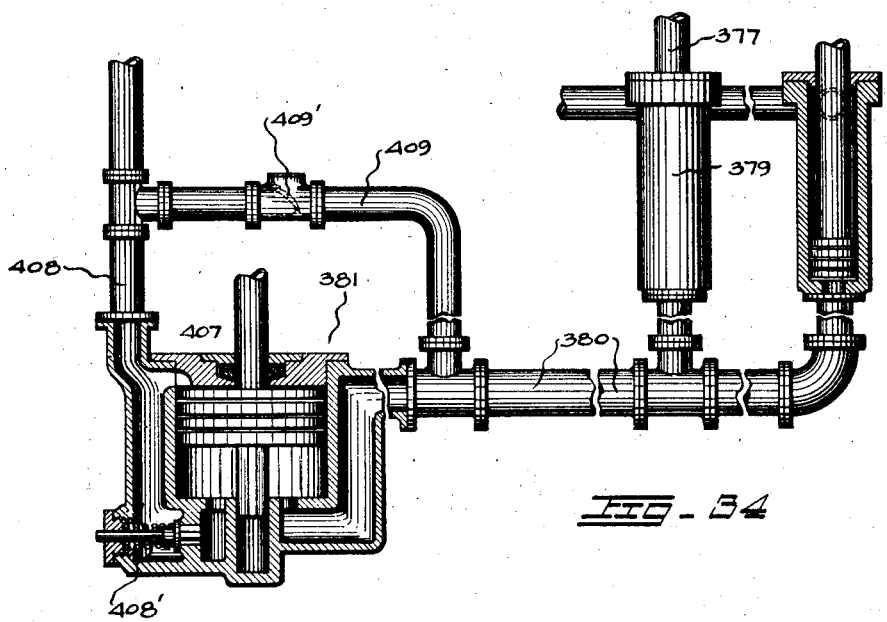
Fig. 34 is a somewhat diagrammatic view showing the arrangement of certain hydraulic operating mechanism.

The lower end of the tube 369 is connected by screw means 376 with a piston rod 377 having on its bottom end a hydraulic piston 378 reciprocable in a cylinder 379 that is connected by a tube 380, Figs. 14 and 34, with a master hydraulic cylinder 381, Fig. 34 showing the hydraulic devices somewhat diagrammatically. In practice more than one master cylinder may be provided and each master cylinder may operate more than one unit if desired.

An adjustable stop member 382 arranged to strike against the work clamping hand 61 is provided on the upper end of the tube 369 to accurately limit the upward movement of said tube. In the testing operation when the block 367 is moved upwardly, if the surface being tested is not correct, said block will engage said surface and move the contact arm far enough to make contact with contact member 373, thus closing a circuit and stopping the machine as hereinafter explained.

The electrical apparatus connected with this machine comprises certain primary control circuits and certain secondary actuating circuits; the primary control circuits being arranged to close the secondary circuits under certain condition, as if anything goes wrong with the machine or the work, and the secondary circuits being arranged to operate certain clutches and locks that start and stop the machine. These circuits, see Fig. 33 control the flow of current to two solenoids 383 and 384 having plungers 385 connected with opposite ends of a lever arm 386 that is fulcrumed on a frame 387 and connected by arm 388 with clutch 389 which connects the driving shaft 138 with another shaft 390 which may be driven by any suitable source of power. A link 391 connects the lever 386 with the bell crank shaped locking arm 182 that controls the stop 181 arranged to engage with the lug 180 on gearwheel 167, see Fig. 5, so that when the clutch 389 is disengaged the stop will be moved into locking position to stop the machine.

The solenoids 383 and 384 have one terminal connected with switch terminals 392 and 393 respectively, which terminals are arranged to be engaged by a switch arm 394 that may be connected with one wire 395 of an actuating circuit. The other terminals of the solenoids 383 and 384 are connected with the other wire 396 of the actuating circuit. The respective solenoid terminals that are connected with contacts 392 and 393 are also connected respectively with circuit wires 397 and 398 that may extend to a distant source of control as to an assembling machine, not shown, which may be provided with circuit closing and circuit opening means, when the circuit is completed through wire 398 current will flow through wire 396 solenoid 384 and wire 398 thereby energizing solenoid 384 opening clutch 389 and stopping the machine. If the circuit through wire 397 is completed while clutch 389 is disengaged, current will flow through wire 396, solenoid 383, and wire 397 thus energizing solenoid 383, closing clutch 389 and starting the machine. The circuits through wires 397 and 398 may be closed in any desired manner as for instance means may be provided for closing the circuit to solenoid 384 automatically and stopping the machine, when sufficient product has been delivered and for closing the circuit to solenoid 383 automatically and starting the machine when more product is needed.

If the shear pin 164 in indexing shaft 165, Fig. 6, is sheared off, tongue 176 will make contact with sleeve 173 thus closing a circuit through wire 396, solenoid 384, wire 399 contact tongue 176, sleeve 173 and grounds 400 to wire 395 and stopping the machine.

Visible signal means will preferably be interposed in the circuit connected with the indexing devices to display a visible signal when the shear pin 164 is sheared off.

The testing units are each provided with a switch of a form more specifically hereinbefore described having a contact arm 371 grounded at 400 and arranged to make contact with a contact member 373 that is connected through electromagnet 402 and commutator 403 with battery 404. Electromagnet 402 is arranged to attract armature hook 405 that normally holds contact arm 394 in the open position shown, against the force of spring 406. A signal lamp 401 is provided in the circuit with each testing tool.

If the work that is being tested by any testing tool is not correct one of the switches connected with the testing tool will close the circuit through battery 404, commutator 403, electromagnet 402 and grounds 400 thereby energizing electromagnet 402 lifting armature hook 405, releasing arm 394 which will engage contact 393 and stop the machine by closing circuit through wire 396 solenoid 384, wire 399, contact 393, arm 394 and wire 395. At the time the circuit to electromagnet 402 is closed the lamp 401 in the particular tool circuit that registers an error will be lighted indicating by a visual signal which testing device has registered an error. The commutator 403 is so timed as to close the circuit to battery 404 and cause the machine to be stopped at the end of a cycle after all tools have been withdrawn from the work and just before the work table indexes.

After the machine has been stopped by disengaging the clutch 389 it may again be started either by moving lever arm 386 manually back to the position shown in Fig. 33 or by moving switch arm 394 into engagement with contact 392 in resetting the same thus closing a circuit through wire 396, solenoid 383, contact 392, arm 394 and wire 395, energizing solenoid 383 and moving lever arm 386 to engage clutch 389 and unlock the machine.

The hydraulic devices, shown diagrammatically in Fig. 34, may include as many operating cylinders 379 and master cylinder 381 as desired, two of each of said cylinders being shown. The master cylinders 381, see also Figs. 1 and 2 may be cam operated having a piston 407 that is connected with a cam 407' whereby it may be reciprocated. The master cylinder 381 is connected with the operating cylinders 379 by pipes 380 and is connected with a source of supply of liquid by pipe 408, a spring pressed relief valve 408' being interposed between pipe 408 and the lower end of master cylinder 381. A by-pass pipe 409 having check valve 409' is interposed between pipe 408 and pipe 380.

At station number XII the frame members are recessed as at 41 to afford room for the operation of broaching apparatus, which consists of two vertically arranged broach guides 410 and 411, having upper, medial, and lower bearing members 412, 413 and 414 respectively that are journaled in bearings 415, 416, and 417. The medial bearing member serves to connect the upper and lower broach guides. The upper bearing member 415 is supported by a rigid frame bracket 409 that extends upwardly from frame 48, Figs. 1, 2, 4 and 22 to 30.

The broach guides are each of substantially the cross sectional shape shown in Fig. 25, are each recessed on each edge and are each provided at each edge with removable caps or plates 418 that are also recessed, the recesses in the caps 418 and the recesses in the edges of the broach guides co-acting to form guideways in which vertically movable broach bars 419 are reciprocably disposed. The broach bars 419 are each provided on one side with a gear rack 420 movable in a groove in the broach guide and arranged to mesh with gearwheels 421 and 422 in the upper and lower broach guides and said broach bars are each provided on another side with grooves 423 wherein broaching tools 424 may be carried, the broaching tools 424 each being securely held between two wedge members 425 and 426. The cutting portion of the broaching tool is of substantially the same shape as the key slot that is to be broached in the tool and is arranged to be moved past the key plug which is securely held in the plug clamping hand 61 as previously explained.

In the operation of broaching, the broach bars move reciprocably in the broach guides and the broach guides are indexed between successive operations through one half of one complete revolution so that each broach bar moves downward and does work while on the inner side of the broach guide and moves upward doing no work while on the outer side of the broach guide.

The broach bars 419 are indexed by connection with the indexing disc 158 through a gearwheel 427 on the bottom side of the indexing disc which meshes with a pinion 428 on the upper end of a shaft 429. The lower end of the shaft 429 is within the housing 40, Fig. 30 and is provided with a gearwheel 430 that is connected by an idler gear 431 with a gear pinion 432 on the lower bearing member 414 of the broach guide. The gear ratio of the several gears and pinions is such as to cause the broach guides to be rotated one half of one complete revolution each time the indexing disc is moved the distance of 18° between two stations. The broach guides are locked after being indexed by a locking tongue 101 on one of the locking members that enters a notch 433 in the lower end of the cover plate 418 of the upper broach member Fig. 26.

Means for starting the indexing movement of the broach guides and for cushioning or tending to slow up the indexing movement of said broach guides at the end of each movement of the same is provided, said means comprising a tension spring 434 Fig. 30, anchored at one end by adjustable turnbuckle means 435 and connected at the other end by linkage 436 and roller 437 with a cross arm 438 on the bottom of the lower broach guide bearing member 414 the cross arm 438 having a slot 439 with curved walls within which the roller 437 operates, which slot is arranged at substantially right angles to the line of pull of the spring 434 so that when the broach guides are at rest the roller will always be in the position shown in Fig. 30 and the tension of the spring 434 will be at a maximum to help start the broach guides. As the broach guides are rotated the tension exerted by the spring will decrease until the line of pull of the spring crosses the line passing through the center of rotation of the broach guides, whereupon the spring tension will increase through the succeeding 90° travel of the broach guides and will be at a maximum just as movement of the broach guides is stopped.

At the instant the broach guides reach the end of their indexing movement and are stopped the cross arm 438 will be turned far enough to cause the roller 437 to roll to the opposite end of the slot 439 and thus the spring will be returned to its initial position in readiness to help start the next indexing movement of the broach guides.

The tension of the spring 434 acting through the broach driving gears 430, 431 and 432, vertical shaft 429 and gears 427 and 428 tends to move the indexing disc 158 the instant it is unlocked and makes necessary the provision of the plates 159 on the disc having the curved surfaces that are in engagement with the roller 162 before the work table is unlocked.

The gear wheels 421 and 422 that drive the broach bars 419 are secured on shafts 441 that are mounted in bearings 442 and are each provided on both ends with discs 443, Fig. 24, each having three peripheral notches 444 wherein both locking and turning means may engage, the locking means comprising dogs 445 reciprocably mounted in guides 446 and urged toward the discs 443 by springs 447. The two dogs forming each pair are connected with each other for simultaneous locking and unlocking movement by levers 448 that are fulcrumed on pivots 449, the inner ends of the links being connected with each other as by slot and pin connections 450.

The locking dogs 445 each have inclined surfaces 451 arranged to be engaged by lugs 452 on driving discs 453 which lugs serve to move the locking dogs outwardly free from the discs 443 as the driving discs are moved toward the discs 443 and at the same time to enter the notches 444 and establish a driving connection between driving discs 453 and discs 443.

The driving discs 453 are secured to transverse shafts 454 that each have spline connections with bevel gears 455 that mesh with other bevel gears 456 splined on an upright shaft 457. The transverse shafts 454 are each provided with shifter collars 458 engaged by rollers 459 on the upright ends of bell crank shifter arms 460. The horizontal arms of the bell cranks 460 are connected with each other by a link 461 Fig. 23 and the horizontal arm of the lower bell crank 460 is connected by a tubular rod 462 with a cross head 463 having a roller 464 that operates in a slot 465 in a cam 466. As the cam 466 rotates the tubular rod 462 is moved vertically thus oscillating the bell cranks 460 and engaging or disengaging the clutches that drive the broach bar. The upright shaft 457 is arranged to be moved vertically by a shifter arm 467 having on its outer end a roller 468 that is arranged to engage with a collar 469 on said upright shaft. The shifter arm 467 is connected by a link 470 with a rod 471 that passes down through the tubular rod 462 and is connected with a cross head 472 having a cam follower operable in a cam slot 473 in a cam 466.

The driving and stop mechanism for the upright shaft 457 is as follows:

Secured to the lower end of the shaft 457 Figs. 28, 29 and 30 is a clutch member 475 having radially projecting teeth 476 that are arranged to fit within suitable recesses in another clutch member 477 that is secured to the housing 45, the same serving, when the shaft 457 is raised to lock said shaft against rotation. Disposed directly below the fixed clutch member 475 is an oscillating clutch member 478 having recesses 479 for the reception of the teeth 476 of the clutch member 475 on the bottom of the vertical shaft 457. The clutch member 478 is provided on the bottom side with a downwardly protruding bearing hub 480 that fits over and is journaled for oscillation on an upwardly protruding hub 481 on a gearwheel 482. Clutch elements 483 adapted for the reception therebetween of the teeth on the clutch member 475 on the end of the vertical shaft 457 are provided within the hub of the gearwheel 482 and an integral sleeve 484 on the lower side of the gearwheel 482 projects downwardly and has a worm wheel 136 keyed thereon.

The oscillating member 478 has an outwardly protruding arm 486 on one side wherein is provided a slot 487 adapted for the reception of a roller 488 on a disc 489 that is secured to and adapted to be rotated by a gear 490 that meshes with the gearwheel 482.

The oscillating member 478 serves as an intermediary in connecting the shaft 457 to, and disconnecting said shaft 457 from, the constantly driven gearwheel 482; as follows: During the indexing period of the broach guides 410 and 411 the clutch member 475 on shaft 457 is engaged with fixed clutch member 477 on gear housing 45 and the broach bars 419 are not movable, one broach bar being at the upper limit and the other broach bar being at the lower limit of travel. At the instant the broach guides have finished indexing and been locked the oscillating member 478 will be momentarily at a dead stop at the location where its direction of oscillation reverses and at this instant the cam 474 operates to move the shaft 457 downwardly and engage clutch element 475 on the end of the shaft 457 with the oscillating clutch element 478. From the point of dead stop, which is at the point at which a line passing through the center of oscillation of the oscillating member 478 is tangent to the circle described by the roller 488 the velocity of the oscillating member increases until it attains a velocity equal to the velocity of the gearwheel 472 at the position shown in Fig. 29 at which instant the cam 474 moves the shaft 457 farther downwardly and causes the clutch element 475 to engage with the clutch element 483 in gearwheel 482 whereupon the gearwheels 421 and 422 willl be rotated sufficiently to carry the respective broach bars 419 from the limit of their movement in one direction to the limit of their movement in the opposite direction. Just prior to the stopping of the broach bars at the end of an excursion of the same the clutch member 475 is moved by the cam 474 into engagement with the clutch of the oscillating member 478 just as the oscillating member attains a velocity equal to the velocity of the gearwheel 482 and is then moved by the cam 474 into engagement with the fixed clutch element 477 just as the oscillating member reaches a point of momentary rest. By functioning in this manner the oscillating member thus serves to uniformly accelerate and retard the starting and stopping of the broach bars.

The downward movement of each broach bar is further retarded and checked at the lowermost limit of its travel by cushioning means Figs. 25 and 27 embodying a plunger 491 disposed in a recess 492 in the broach guide and urged upwardly by a compression spring 493 the descending broach bar 419 being arranged to strike upon a segment of the head 494 of the plunger which projects into the guideway in which the broach moves.

At one station immediately following the station where the broaching work is done I provide means for testing the work of the broaching tools, and at a later station I provide similar means for burring the slot or keyway that is formed by the broaching tools the burring operation being necessary because certain tools that might tend to produce a ragged edge or burr in the broached slot are provided. These testing and burring devices may be substantially identical and are illustrated in Figs. 31 and 32.

Each of said devices comprises a testing or burring tool 495 mounted on a cross arm 496 which is adjustably secured to the upper end of a bar 497 that is guided for reciprocation vertically in a guide 498, the bar 497 preferably being square in cross section to prevent the same from turning. The bottom end of the bar 497 is tubular for the telescopic reception of a rod 499 that is guided for vertical reciprocation in a bearing bracket 500. A compression spring 501 is interposed between a lower collar 502 that is fixed to the rod 499 and an upper collar 503 that is slidable on the rod 499 and is arranged to bear against the bottom end of the bar 497. A guide pin 504 extends through the rod 499 and is movable in longitudinal slots 505 in the bar 497. A contact spring 506, mounted within a recess in one side of the upper end of the rod 499 is normally separated from an insulated contact post 507 that enters through the side of the bar 497 but is arranged to make electrical contact with the end of said contact post if the tool 495 encounters any obstruction that causes the rod 499 to telescope into the bar 497 thereby closing the circuit hereinbefore described to the solenoid 403.

The lower end of the rod 499 is connected as by a slot and roller connection 508 with the end of a cam follower 509 that is fulcrumed on the frame by a pivot 510 and which has a roller 511 operable in a slot in a cam 512 so that the testing or burring tool 495 will be raised once during each cycle of the machine. For cleaning the broaching tools 424 I preferably provide a rotatably mounted brush 513 mounted in the path of the broach tool and arranged to be driven by a belt 514 that passes around a pulley 515 on the shaft 457.

In the operation of the machine the blank of material is inserted into and clamped in the clamping hand 61 at station number I. As the work table is indexed around, the blank of material is worked on and the work tested at the various succeeding stations until finally, at station 19, the work is unclamped and at station 20 the finished piece of work is discharged from the machine. Preferably the work done by a tool at one station or a series of stations is tested at the next succeeding station thereby catching an error as soon as it is made. This sequence of operations may, however, be deviated from where mechanical construction makes it advisable to do so.

In this machine I find it advantageous to use the following sequence of operations at the several stations which stations are designated by roman numerals in Fig. 2. At station I a blank of material of the form of a key plug as in Fig. 32 is inserted into and clamped in the hand 61. At stations II and III, certain small holes known as ejector holes are drilled in the blank. These holes being very close together, it is necessary to drill alternate holes at station II and the remaining alternate holes at station III. At station IV these ejector holes are tested. At stations V and VI, certain larger pin receiving holes are drilled in the blank, said pin receiving holes also being so close together as to necessitate drilling alternate holes at different stations. At station VII the pin receiving holes are tested. At station VIII a flat portion is milled on one side of the blank. At station IX a shallow concave recess or spot is drilled in the end of the blank. At stations X and XI the flat milled portion and the concave recessed portion or spot are tested. At station II a keyway is broached in the blank. At station XIII the keyway is tested by a suitable testing tool. At stations XIV and XV the pin holes that were drilled at stations V and VI are reamed and finished. At station XVI the reamed pin holes are tested. At station XVII a burring tool is passed through the keyway to remove any burrs therefrom. Station XVIII is an idle station reserved for the use of any tool that may be found necessary in special work. At station XIV the hand is unclamped so as to release the blank and at station XX the finished blank is unloaded from the hand 61, leaving the hand ready to receive a new blank at station I and repeat the cycle of operations.

The horizontal work table rotatable on a vertical axis makes possible efficient utilization of floor space and yet permits the use of tools that require a wide range of movement as the broaching mechanism herein described. It also makes possible the movement of work from one station to another without loss of time and further makes it feasible to hold the work and to drive the tools and move them toward and away from the work.

The foregoing description and accompanying drawings clearly disclose what I now consider to be a preferred embodiment of the invention but it will be understood that many changes in the device may be resorted to within the scope and spirit of the following claims:

1. In an automatic machine, a rotatably mounted work table arranged for indexing movement, a plurality of work holding devices carried in the peripheral portion of said work table, a plurality of tools arranged at intervals in normally spaced relation from said work table and in substantial alignment with said work holding devices, a gear housing located ventrally of said tools and coaxially of said work table, driving gears in said housing a plurality of tool driving shafts projecting radially from said housing for driving said tools and a plurality of cam shafts extending radially from said housing for moving said tools toward and away from said work holding devices.

2. In an automatic machine a rotatably mounted work table arranged for indexing movement, a plurality of work clamping hands mounted in the peripheral portion of said work table, a plurality of tools arranged at intervals in normally spaced relation from said work table and in substantial alignment with said work clamping hands, a gear housing located axially of said work table, a plurality of radially disposed tool driving shafts projecting outwardly from said gear housing, bevel pinions on the inner ends of said tool driving shafts, two bevel gears disposed on opposite sides of said pinions and meshing with the same and means for driving said bevel gears.

3. In an automatic machine a work table axially mounted for indexing movement, a plurality of work clamping hands supported for oscillation in the peripheral portion of said work table, a shank movable axially of each of said work clamping hands, spiral thread means interconnecting said shanks and said hands for oscillating said hands when said shanks are moved longitudinally and means for moving said shanks longitudinally.

4. In an automatic machine of the class described, a rotatably mounted work table arranged for indexing movement about a vertical axis, a plurality of work clamping hands supported in the peripheral portion of said work table for rotation about axes that are perpendicular to the axis of said work table, a fixed cam plate below said work table, and means operated by said cam plate for turning said work clamping hands about their respective axes into various adjusted positions.

5. In an automatic machine of the class described a rotatably mounted work table, a plurality of work clamping hands mounted in the peripheral portion of said work table, means for indexing said work table to bring said work clamping hands opposite successive work stations, automatic means for loading work into said work clamping hands at one of said stations and automatic means for discharging work from said work clamping hands at another of said stations.

6. In an automatic machine of the class described a work table rotatably mounted on a vertical axis, means for indexing said work table, a plurality of locking members arranged adjacent the periphery of said work table for locking the same, a lock operating rod movable axially of said work table and toggle means interconnecting said locking members and said rod for moving said locking members in response to movement of said rod.

7. In an automatic machine of the class described a horizontal work table mounted for rotation on a vertical axis, a lock operating rod disposed axially of said work table, means for moving said lock operating rod vertically, a disc on the upper end of said lock operating rod, a plurality of radial link members pivotally connected with said lock operating rod and a plurality of locking members pivotally connected with said link members and arranged to lock said work table against rotary movement.

8. In an automatic machine of the class described, a horizontal work table mounted for rotation on a vertical axis, a lock operating rod disposed axially of said work table, means for moving said lock operating rod vertically, a disc on the upper end of said lock operating rod, a plurality of locking members arranged to lock said work table against rotary movement, and a plurality of radially arranged links pivotally connecting said locking members and said disc, each of said links being formed of two relatively extensible members yieldingly urged apart by spring means whereby said locking members will be yieldingly held in locked position.

9. In an automatic machine of the class described, a frame, a work table mounted for rotation in said frame, a plurality of work clamping hands movably mounted in the peripheral portion of said work table, means controlling the movements of said hands, means for imparting successive indexing movements to said work table and locking devices for simultaneously locking said work table and said work clamping hands.

10. In an automatic machine of the class described, a frame, a work table mounted for rotation in said frame, a plurality of work clamping hands mounted in the peripheral portion of said work table and arranged to be rotated on axes that are disposed radially of said work table, means for turning said hands, means for indexing said work table and locking members arranged to simultaneously lock said hands against turning movement and said work table against rotary movement between successive indexing periods.

11. In an automatic machine of the class described a frame, a work table rotatably mounted in said frame, an indexing disc secured to said work table, said indexing disc having peripheral notches, and constantly rotating crank means movable perpendicularly of said disc into and out of engagement with said notches for indexing said disc.

12. In a multiple station automatic machine, a frame, a work table rotatively mounted in said frame, an indexing disc rigid with said work table, means for imparting successive indexing movements to said indexing disc and shear means for rendering the driving means for said indexing disc inoperative upon failure of said indexing disc to index properly.

13. In an automatic machine of the class described, a frame, a work table rotatably mounted in said frame, means for driving said machine and electrically operated means for stopping said machine upon failure of said work table to index properly.

14. In a multiple station automatic machine, a frame, a work table rotatably mounted in said frame driving means for imparting successive indexing movements to said work table, shear means for rendering the driving means for said work table inoperative and electrically operated devices for stopping said machine when said work table driving means is rendered inoperative.

15. In an automatic machine of the class described, a frame, a work table rotatably mounted in said frame, an indexing disc rigid with said work table said indexing disc having peripheral notches, a longitudinally movable shaft arranged at right angles to said indexing disc and terminating adjacent said peripheral notches, means for moving said shaft longitudinally, and rotatively, and a crank member secured by relatively weak shear means to the upper end of said shaft for engaging within said notches and imparting successive indexing movements to said disc and said work table.

16. In a multiple station automatic machine, a frame, a work table rotatably mounted in said frame, an indexing disc secured to said work table, said indexing disc having peripheral notches, a longitudinally movable shaft arranged at right angles to said indexing disc and terminating adjacent said peripheral notches, a crank member, shear pin means for securing said crank member to the upper end of said longitudinally movable shaft whereby said crank member may enter the notches within said indexing disc and move said indexing disc, means for closing electric circuits in response to a failure of said shear pin means and devices operated by the closing of said circuits for stopping said machine.

17. In an automatic machine, a rotatably mounted work table, means for moving said work table by successive indexing movements, work holding means in the peripheral portion of said work table, tools operable on work carried by said work holding means, devices for testing the work done by said tools and electrical means connected with said work testing devices for stopping said machine if the work of said tools is not properly done.

18. In an automatic machine, a horizontally disposed circular work table mounted for rotation on a vertical axis, a plurality of work clamping hands mounted in the peripheral portion of said work table, means for imparting successive indexing movements to said work table, a plurality of driven tools arranged at intervals concentrically of the axis of said machine and in substantial alignment with said work clamping hands, and driven cams arranged around said machine for imparting vertical movements to said tools.

19. In a multiple station automatic machine an upright circular lower frame and an upper frame embodying a base ring arranged to rest on said lower frame, spaced apart radial supports extending upwardly from said base ring, a fluted portion above said radial supports and an overhanging ring-like portion above said fluted portion, said fluted portion and the spaces between said radial supports forming indentations wherein tool units may be operatively disposed.

20. In a multiple station automatic machine an upright upper frame embodying a circular base ring, spaced apart radial webs extending upwardly from said base ring and affording openings therebetween, a fluted portion above said webs the indentations of said fluted portion registering with the spaces between said webs, an overhanging ring-like portion above said fluted portion and having vertical openings that register with the indentations in said fluted portion, a rotatable work table operatively disposed in said overhanging ring-like portion and tool units operatively disposed in the indentations formed by said fluted portion and said webs.

21. In a multiple station automatic machine an upper cylindrical frame supported on a vertical axis, said frame embodying a base ring, spaced apart radial webs extending upwardly from said base ring and affording openings therebetween, a fluted portion above said webs having indentations that register with the spaces between said webs, an overhanging cylindrical portion above said fluted portion having openings that register with the indentations of said fluted portion, a work table supported for indexing movement within said overhanging cylindrical portion, work holding devices in said work table arranged to register with the indentations of said fluted portion and tool units operatively disposed in the indentations of said fluted portions, said tool unit embodying tools vertically movable into engagement with work held in said work holding devices.

22. In an automatic machine of the class described a work table arranged to be indexed about a vertical axis, a broach guide mounted for indexing movement on a vertical axis at the side of said work table and vertically movable broach bars carried by said broach guide and operable on work carried by said work table.

23. In an automatic machine of the class described, a work table arranged to be indexed about a vertical axis, work holding means in the peripheral portion of said work table, a broach guide mounted for indexing movement at the side of said work table, and vertically movable broach bars carried by said broach guide, the broach bar on the innermost side of said broach guide being arranged to move downwardly through said work table and operate on work carried by said work holding means.

24. In an automatic machine of the class described a work table rotatably mounted on a vertical axis, a broach guide rotatably mounted on a vertical axis, at the side of said work table, broach bars movable vertically of said broach guide and operable on work carried by said table, and means connected with said work table for indexing said broach guide.

25. In an automatic machine of the class described a rotatably mounted work table, a rotatably mounted broach guide at the side of said work table, means for indexing said work table, means connected with said work table for indexing said broach guide and devices for locking said work table and said broach guide between successive indexing movements.

26. In an automatic machine of the class described a work table arranged to be indexed about a vertical axis, work holding means in the peripheral portion of said work table, a broach guide mounted on a vertical axis at the side of said work table, means for indexing said broach guide through one half of one complete revolution, two broach bars guided for movement in opposite sides of said broach guide and rack and pinion means for moving the outermost broach bar upwardly and the innermost broach bar downwardly, the innermost broach bar being arranged to move downwardly within the limits of the periphery of said work table and to engage with work in said work holding means.

27. In an automatic machine of the class described a work table rotatably mounted on a vertical axis, work holding means in the peripheral portion of said work table, a broach guide embodying an upper and a lower guide member disposed above and below the plane of said work table respectively and arranged to project inwardly past the peripheral portion of said work table, a broach guide bearing adjacent the periphery of said work table, gearwheels mounted in the upper and lower broach guide members respectively, rack bars arranged to be moved vertically of said broach guide by said gearwheels, the innermost rack bar being arranged to move through said work table, broaching tools carried by said rack bars, means for indexing said broach guides, means for rotating said gearwheels and means for reversing the direction of rotation of said gearwheels each time said broach guide is indexed.

28. In an automatic machine of the class described a broaching device embodying a broach guide mounted for indexing movement on a vertical axis, two diametrically opposite broach bars movable vertically in said broach guide, means for supporting work in the path of movement of the broach bar at one side of said broach guide and means for indexing said broach guide.

29. In an automatic machine a horizontal work table arranged to be indexed about a vertical axis, work holding means in the peripheral portion of said work table and broaching tools movable past said work holding means.

30. In an automatic machine a horizontal work table arranged to be indexed about a vertical axis, work holding means in the peripheral portion of said work table, station tools movable toward and away from said work holding means and broaching tools movable past said work holding means.

31. In a multiple station automatic machine a horizontal work table arranged to be indexed about a vertical axis, work clamping hands mounted in the peripheral portion of said work table, a broach guide mounted for rotation on a vertical axis adjacent the periphery of said work table and vertically movable broaching tools carried by said broach guide and arranged to engage with work held in said work clamping hands.

FRANK ELLISON BEST.